United States Patent
Tandai et al.

(10) Patent No.: US 10,616,883 B2
(45) Date of Patent: Apr. 7, 2020

(54) WIRELESS COMMUNICATION DEVICE

(71) Applicant: KABUSHIKI KAISHA TOSHIBA, Minato-ku, Tokyo (JP)

(72) Inventors: Tomoya Tandai, Tokyo (JP); Tomoko Adachi, Kanagawa (JP); Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 33 days.

(21) Appl. No.: 15/452,285

(22) Filed: Mar. 7, 2017

(65) Prior Publication Data
US 2017/0181164 A1    Jun. 22, 2017

Related U.S. Application Data

(63) Continuation of application No. PCT/JP2016/058373, filed on Mar. 16, 2016.

(30) Foreign Application Priority Data

Mar. 20, 2015 (JP) .................................. 2015-058437

(51) Int. Cl.
*H04W 72/04* (2009.01)
*H04W 84/12* (2009.01)
(Continued)

(52) U.S. Cl.
CPC ........ *H04W 72/0446* (2013.01); *H01Q 1/243* (2013.01); *H04L 5/0007* (2013.01);
(Continued)

(58) Field of Classification Search
CPC ......... H04W 72/0446; H04W 52/0225; H04W 74/0816; H04W 84/12; H01Q 1/243;
(Continued)

(56) References Cited

U.S. PATENT DOCUMENTS 7,408,909 B2 * 8/2008 Trainin ................. H04L 1/1671
370/338
7,751,356 B2   7/2010 Kim et al.
(Continued)

FOREIGN PATENT DOCUMENTS

JP   2006-013559 A   1/2006
JP   2008-187300 A   8/2008
(Continued)

OTHER PUBLICATIONS

Liwen Chu et al., presented at IEEE 802.11-11/0059r1, titled "RTS CTS Rule Amendment" have a date of Jan. 17, 2011, (Chu hereinafter) was published Jan. 17, 2011.*
(Continued)

*Primary Examiner* — Andrew Lai
*Assistant Examiner* — Harry H Kim
(74) *Attorney, Agent, or Firm* — Foley & Lardner LLP

(57) ABSTRACT

According to one embodiment, a wireless communication device, includes: a receiver configured to receive a first frame that requests permission of transmission; and controlling circuitry configured to perform control to prevent transmission in a case where the first frame is not addressed for the own device, wherein the controlling circuitry is configured to keep prevention of the transmission even when a second frame notifying the permission of transmission is not received after a lapse of a first time period following receipt of the first frame.

15 Claims, 23 Drawing Sheets

(51) Int. Cl.
  *H04W 74/08* (2009.01)
  *H04W 52/02* (2009.01)
  *H04L 5/00* (2006.01)
  *H01Q 1/24* (2006.01)
(52) U.S. Cl.
  CPC .......... *H04L 5/0023* (2013.01); *H04L 5/0037* (2013.01); *H04L 5/0082* (2013.01); *H04L 5/0091* (2013.01); *H04W 52/0225* (2013.01); *H04W 74/0816* (2013.01); *H04W 84/12* (2013.01); *Y02D 70/00* (2018.01); *Y02D 70/142* (2018.01); *Y02D 70/168* (2018.01); *Y02D 70/26* (2018.01)
(58) Field of Classification Search
  CPC .... Y02D 70/00; Y02D 70/142; Y02D 70/168; Y02D 70/26; H04L 5/0023; H04L 5/0091; H04L 5/0037; H04L 5/0082; H04L 5/0007
  See application file for complete search history.

(56) References Cited

U.S. PATENT DOCUMENTS

| | | | |
|---|---|---|---|
| 8,023,480 B2* | 9/2011 | Kwon | H04W 74/0816 370/338 |
| 8,320,358 B2* | 11/2012 | Wang | H04W 74/0841 370/349 |
| 8,780,728 B1 | 7/2014 | Woodley et al. | |
| 8,897,279 B2 | 11/2014 | Seok | |
| 8,918,137 B2 | 12/2014 | Niu et al. | |
| 8,934,504 B2 | 1/2015 | Schwartz et al. | |
| 2002/0159426 A1 | 10/2002 | Kanemoto et al. | |
| 2004/0001429 A1 | 1/2004 | Ma et al. | |
| 2005/0135324 A1 | 6/2005 | Kim et al. | |
| 2005/0243780 A1 | 11/2005 | Trainin et al. | |
| 2005/0265298 A1 | 12/2005 | Adachi et al. | |
| 2006/0120395 A1 | 6/2006 | Xing et al. | |
| 2006/0285517 A1 | 12/2006 | Kakani | |
| 2007/0165731 A1 | 7/2007 | Xiao et al. | |
| 2008/0079735 A1 | 4/2008 | Selwan et al. | |
| 2008/0192622 A1 | 8/2008 | Scheim et al. | |
| 2009/0161587 A1 | 6/2009 | Ishii et al. | |
| 2009/0232053 A1 | 9/2009 | Taki et al. | |
| 2009/0310698 A1 | 12/2009 | Agarwal et al. | |
| 2010/0002641 A1 | 1/2010 | Li et al. | |
| 2010/0040011 A1 | 2/2010 | Kang et al. | |
| 2010/0040015 A1 | 2/2010 | Ernstrom et al. | |
| 2010/0061284 A1 | 3/2010 | Chen et al. | |
| 2010/0080164 A1 | 4/2010 | Power et al. | |
| 2010/0202372 A1 | 8/2010 | Chun et al. | |
| 2010/0202373 A1 | 8/2010 | Chun et al. | |
| 2010/0208669 A1 | 8/2010 | Chun et al. | |
| 2010/0272042 A1 | 10/2010 | Chun et al. | |
| 2011/0044302 A1 | 2/2011 | Toshimitsu et al. | |
| 2011/0053626 A1 | 3/2011 | Lim et al. | |
| 2011/0064019 A1 | 3/2011 | Chun et al. | |
| 2011/0075748 A1 | 3/2011 | Novak et al. | |
| 2011/0149890 A1 | 6/2011 | Chun et al. | |
| 2011/0183678 A1 | 7/2011 | Kerpez et al. | |
| 2011/0188399 A1 | 8/2011 | Jung et al. | |
| 2011/0216684 A1 | 9/2011 | Kim et al. | |
| 2011/0222486 A1* | 9/2011 | Hart | H04L 5/001 370/329 |
| 2011/0268070 A1 | 11/2011 | Guan et al. | |
| 2011/0305236 A1* | 12/2011 | Morioka | H04W 74/0808 370/345 |
| 2012/0014336 A1 | 1/2012 | Seok | |
| 2012/0020268 A1 | 1/2012 | Sharma et al. | |
| 2012/0140695 A1 | 6/2012 | Hunzinger et al. | |
| 2012/0182963 A1 | 7/2012 | Kneckt et al. | |
| 2012/0220228 A1 | 8/2012 | Tandai et al. | |
| 2012/0294222 A1 | 11/2012 | Kim et al. | |
| 2012/0320856 A1* | 12/2012 | Kim | H04W 28/26 370/329 |
| 2013/0003679 A1 | 1/2013 | Seok et al. | |
| 2013/0022020 A1 | 1/2013 | Novak et al. | |
| 2013/0029718 A1 | 1/2013 | Saito | |
| 2013/0170376 A1 | 7/2013 | Dinan | |
| 2013/0188569 A1 | 7/2013 | He et al. | |
| 2013/0201835 A1 | 8/2013 | Banerjea et al. | |
| 2013/0258996 A1 | 10/2013 | Jung et al. | |
| 2013/0272262 A1* | 10/2013 | Li | H04L 5/0048 370/330 |
| 2013/0286882 A1 | 10/2013 | Lim et al. | |
| 2014/0016596 A1 | 1/2014 | Kim et al. | |
| 2014/0086200 A1 | 3/2014 | Seok | |
| 2014/0126506 A1 | 5/2014 | Horiuchi et al. | |
| 2014/0192713 A1 | 7/2014 | Park et al. | |
| 2014/0200014 A1 | 7/2014 | Iwai | |
| 2014/0204891 A1 | 7/2014 | Park et al. | |
| 2014/0226607 A1 | 8/2014 | Holma et al. | |
| 2014/0254452 A1 | 9/2014 | Golitschek Edler Von Elbwart et al. | |
| 2014/0301377 A1 | 10/2014 | Sugitani et al. | |
| 2015/0230271 A1 | 8/2015 | Takagi et al. | |
| 2015/0256219 A1* | 9/2015 | Linden | H04W 56/0015 375/133 |
| 2015/0341933 A1* | 11/2015 | Aboul-Magd | H04L 5/0044 370/329 |
| 2016/0029389 A1* | 1/2016 | Merlin | H04J 1/14 370/330 |
| 2017/0034723 A1 | 2/2017 | Anand et al. | |
| 2017/0064598 A1 | 3/2017 | Jain et al. | |
| 2017/0181164 A1 | 6/2017 | Tandai et al. | |
| 2019/0124657 A1* | 4/2019 | Kim | H04W 74/0816 |

FOREIGN PATENT DOCUMENTS

| | | |
|---|---|---|
| JP | 2009-171506 A | 7/2009 |
| JP | 2010-178086 A | 8/2010 |
| WO | WO-2013/168389 A1 | 11/2013 |
| WO | WO-2016/152683 A1 | 9/2016 |

OTHER PUBLICATIONS

George Vlantis et al., presented at IEEE 802.11-10/1096r7, titled "80MHz/160MHz Protection" have a date of Sep. 14, 2010, Vlantis hereinafter) was published Sep. 14, 2010.*
Stacey, Robert: "Specification Framework for TGax", IEEE 11-15-0132-02-00ax-spec-framework, Intel, Jan. 2015, pp. 1-3.
Stacey, Robert: "Specification Framework for TGax", IEEE 11-15-0132-17-00ax-spec-framework, Intel, May 2016, pp. 1-61.
U.S. Appl. No. 15/443,056, filed Feb. 27, 2017, Kabushiki Kaisha Toshiba.
Chu, Liwen et al.: "RTS CTS Rule Amendment", IEEE 802.11-11/0059r1, IEEE Mentor, STMicroelectronics, Jan. 18, 2011, pp. 1-5, slide 2.
Chu, Liwen et al.: "80MHz/160MHz TXOP Protection", IEEE 802.11-10/1096r7, IEEE Mentor, STMicroelectronics, Sep. 15, 2010, pp. 1-13, slide 7.
IEEE Standards Association/IEEE Computer Society: "Part II: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.
IEEE Standards Association/IEEE Computer Society: "Part II: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
Stacey, Robert: "Specification Framework for TGax", IEEE 802.11-15/0132r15, Intel, Jan. 2016, pp. 1-43.
Stacey, Robert: "Specification Framework for TGax", IEEE 802.11-15/0132r2, Intel, Jan. 2015, pp. 1-3.
Non-Final Office Action U.S. Appl. No. 15/443,056 dated Jan. 23, 2019.

(56) References Cited

OTHER PUBLICATIONS

Final Office Action U.S. Appl. No. 15/443,056 dated Jul. 1, 2019.

* cited by examiner

| L-STF | L-LTF | L-SIG | VHT-SIG-A | VHT-STF | Seq. | VHT-LTF | VHT-SIG-B | MAC Frame |

FIG. 16

WIRELESS COMMUNICATION DEVICE

CROSS REFERENCE TO RELATED APPLICATIONS

This application is a Continuation of International Application No. PCT/JP2016/058373, filed on Mar. 16, 2016, the entire contents of which is hereby incorporated by reference.

FIELD

Embodiments of the present invention relate to a wireless communication device.

BACKGROUND

Multi-user Multi-Channel (MU-MC) communication that allows multiple terminals to use multiple channels simultaneously has become a focus of attention. This communication is also called a channel-based OFDMA (Orthogonal Frequency Division Multiple Access) communication. For example, methods of simultaneously transmitting data from a transmitting terminal (base station or the like) to multiple receiving terminals using multiple channels other than the primary channel have been discussed.

The MU-MC communication uses the multiple channels. It can thus be considered that during the base station's transmission to a terminal through a certain channel, another terminal starts transmission to a terminal through another channel to the base station. In this case, to allow the base station to receive the signal through the other channel concerned, a full duplex scheme is required to be supported. This requirement complicates the configuration of the base station. In a case where the base station does not support the full duplex scheme, the base station can receive no signal. Consequently, the terminal uselessly consumes power.

BRIEF DESCRIPTION OF THE DRAWINGS

FIG. 16 is a diagram showing an example of a format of a physical packet;

DETAILED DESCRIPTION

According to one embodiment, a wireless communication device, includes: a receiver configured to receive a first frame that requests permission of transmission; and controlling circuitry configured to perform control to prevent transmission in a case where the first frame is not addressed for the own device, wherein the controlling circuitry is configured to keep prevention of the transmission even when a second frame notifying the permission of transmission is not received after a lapse of a first time period following receipt of the first frame.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
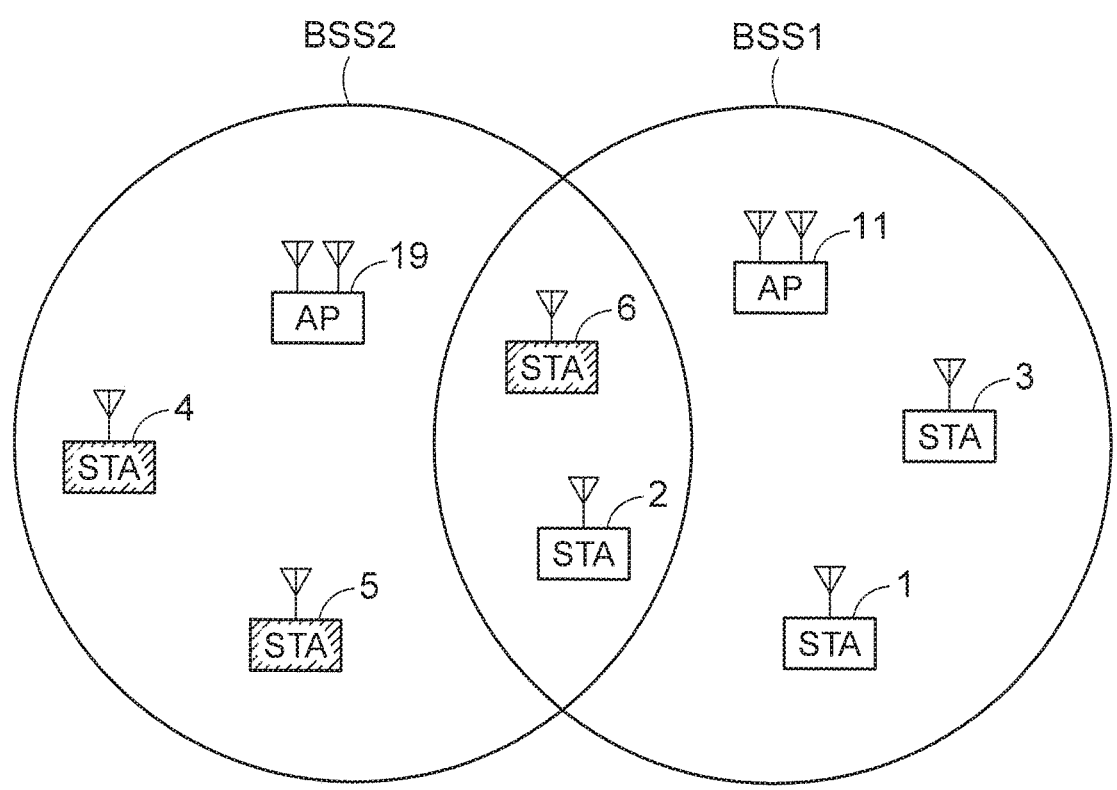
FIG. 1 is a configuration diagram of a wireless communication system that includes base stations and terminals according to a first embodiment.

FIG. 1 is a configuration diagram of a wireless communication system that includes wireless communication base stations and wireless communication terminals according to a first embodiment. This wireless communication system performs communication according to any communication scheme, such as IEEE 802.11 standard. A case of communication according to IEEE 802.11 standard is herein assumed. However, the scheme is not limited thereto. Hereinafter, the wireless communication base station is called a base station, and the wireless communication terminal is called a terminal or a wireless terminal. The base station is one form of the terminal, but is different mainly in that the base station has a relay function.

Terminals (STA: STAtions) 1, 2 and 3 are connected to a base station (AP: Access Point) 11 to form one wireless communication system or a wireless communication group (BSS: Basic Service Set). Connection means a state where a wireless link is established. The terminals 1 to 3 are subjected to an association process with the base station 11, and then complete exchange of parameters required for communication, thus establishing the wireless link. In this state, the base station and the terminals grasp the capacities of the opposite parties. Association IDs (AIDs) are allocated to the respective terminals having established the wireless links. The AID is an identifier to be allocated in an association process which the terminal performs to belong to the BSS of the base station. The base station identifies the terminals connected to this station on the basis of the respective AIDs or MAC addresses. In FIG. 1, the three terminals belong to the BSS (BSS1) of the base station 11. Alternatively, four or more terminals may belong to the base station 11, or two or less terminals may belong to the base station 11. FIG. 1 shows the configuration as if the base station might include two antennas and each terminal might include one antenna. In actuality, the numbers of antennas of the base station and the terminal may each be any number that is one or more in conformity with functions to be implemented.

Furthermore, another wireless communication system or wireless communication group (hereinafter BSS2) is arranged besides BSS1. Terminals (STA) 4, 5 and 6 are connected to a base station 19. The blocks representing the terminals connected to the base station 19 are hatched. The terminals 6 and 2 reside in an overlapping area between the coverage areas of the base stations 19 and 11. The three terminals belong to the BSS2. Alternatively, four or more terminals may belong to the base station 19, or two or less terminals may belong to the base station 19.

The base station 19 and the terminals 4 to 6 belonging to the BSS2 may be a legacy base station and legacy terminals, or a base station and terminals in conformity with this embodiment. The legacy base station and terminals communicate with each other according to IEEE 802.11b/g/n/ac or the like, for example. The base stations and terminals according to this embodiment are configured to have capability of communicating with the legacy base stations and terminals. Legacy terminals may reside in the BSS1. The description is hereinafter made mainly on the base station 11 and the terminals 1 to 3 belonging to the BSS1. In a case where the base station 19 and the terminals 4 to 6 are the base station and terminals according to this embodiment, these base station and terminals have configurations analogous to those of the base station 11 and terminals 1 to 3.

The base station 11 according to this embodiment can simultaneously receive or transmit from or to multiple terminals using multiple wireless channels (hereinafter channels) in a predetermined frequency band. The base station allocates one or more channels to each of terminals, and receives or transmits simultaneously with the terminals. Such a communication scheme is called a channel-based OFDMA (Orthogonal Frequency Division Multiple Access) scheme or Multi-user Multi-Channel (MU-MC) communication scheme.

This embodiment assumes eight channels, or channels 1 to 8 in an ascending order of frequency, as the multiple channels in the predetermined frequency band. The numerals 1 to 8 of the channels 1 to 8 indicate the respective channel numbers. For example, the channel 1 indicates the channel to which the channel number 1 is allocated. The channel numbers here are numerals for defining, for convenience, channels that have an assumed unit channel width (e.g., 20 MHz width) and are arranged without overlapping with each other. This embodiment assumes a case where the higher the center frequency, the higher the channel number is. This case is an example. The order of the center frequencies does not necessarily coincide with the order of channel numbers.

In this embodiment, a mode that thus uses the channel-based OFDMA scheme (MU-MC communication) is described. Alternatively, a resource-unit-based OFDMA scheme may be used that allocates, to multiple terminals, resource units each having one or sequential subcarriers as a unit and simultaneously communicate.

Figure 2:
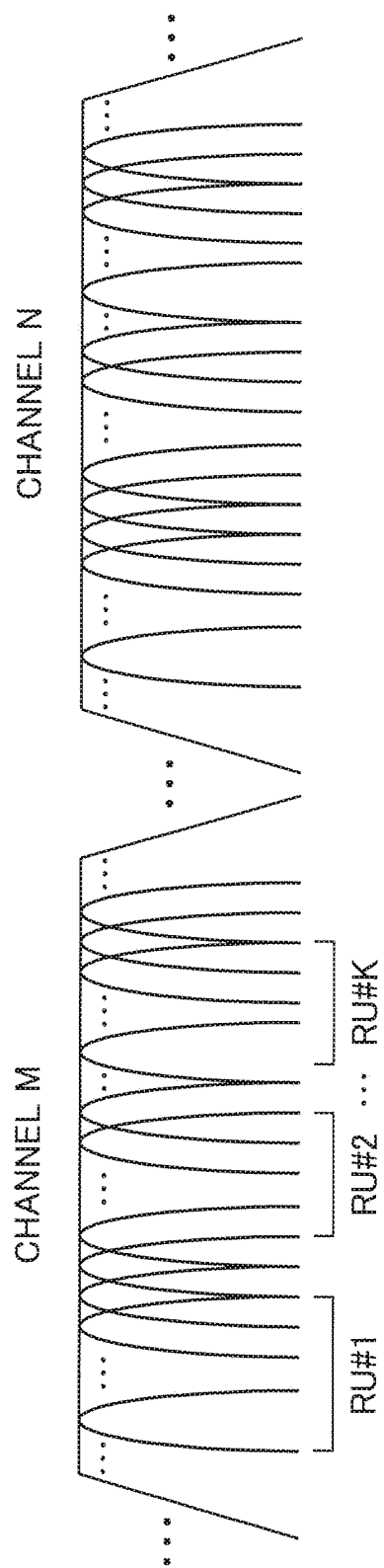
FIG. 2 is a diagram illustrating OFDMA on a resource unit basis.

For example, as shown in FIG. 2, the multiple channels are arranged in the frequency domain, and the individual channel widths (e.g., each having 20 MHz) sequentially form the frequency domain. In one channel, subcarriers sequentially arranged in frequency are orthogonal to each other. Resource units that each have one or more sequential subcarriers as one unit and may be called subchannels, resource blocks or the like instead are defined. One or more resource units are allocated to each terminal. The scheme that allocates resource units to individual terminals is called resource-unit-based OFDMA. FIG. 2 shows resource units (RU #1, RU #2, . . . . , RU #K) secured in a continuous frequency domain in one channel (here, described as channel M). Between the resource units, one or more subcarriers (guard subcarriers) may be arranged. However, the guard subcarrier is not necessary. The number of guard subcarriers is not limited to two, but may be any number at least one.

Allocation on a resource unit basis may be performed to each terminal using one or more channels among the channels 1 to 8 in this embodiment. The numbers of subcarriers per resource unit are the same in each channel. The numbers of subcarriers per resource unit may be allowed to be different between channels. The numbers of subcarriers in each of the resource units that belong to the same channel are the same. Alternatively, the number of subcarriers may be allowed to be different between the resource units. On or more resource units in one channel may be allocated to the terminal. Alternatively, multiple resource units belonging to multiple channels may be allocated to the terminal. The number of subcarriers in the channel may vary according to the number of channels used in the resource-unit-based OFDMA. For example, in a case where one channel is used in the resource-unit-based OFDMA, the number of subcarriers in the channel may be X. In a case where two channels are used, the number of subcarriers per channel may be X/2. In this case, as the number of subcarriers is small, the bandwidth of the subcarrier is large accordingly. On the contrary, as the number of subcarriers is large, the bandwidth of the subcarrier is small accordingly. In a case where the resource unit is defined as all the subcarriers in one channel, the operation of resource-unit-based OFDMA is substantially identical to that of the channel-based OFDMA.

The following description assumes the channel-based OFDMA that performs allocation to the terminals in units of channels. In another case where the resource-unit-based OFDMA scheme that performs allocation to the terminal in units of resource units is used, implementation can be achieved by reading the following description with the channel being replaced with the resource unit, and with the channel-based OFDMA (MU-MC) being replaced with the resource-unit-based OFDMA. Irrespective of whether the resource unit basis and the channel basis, communication may be performed using, as the basic channel, the primary channel commonly recognized across the system, during the normal operation period without OFDMA communication. In the primary channel, monitoring and transmission and reception may be performed even during resource-unit-based OFDMA communication. In the channel-based or resource-unit-based OFDMA, the communication directions during data transmission include the downlink from the base station to each terminal and the uplink from each terminal to the base station. This embodiment mainly assumes the case of downlink. However, the case of uplink can be implemented in a manner analogous to that of this embodiment.

Figure 3:
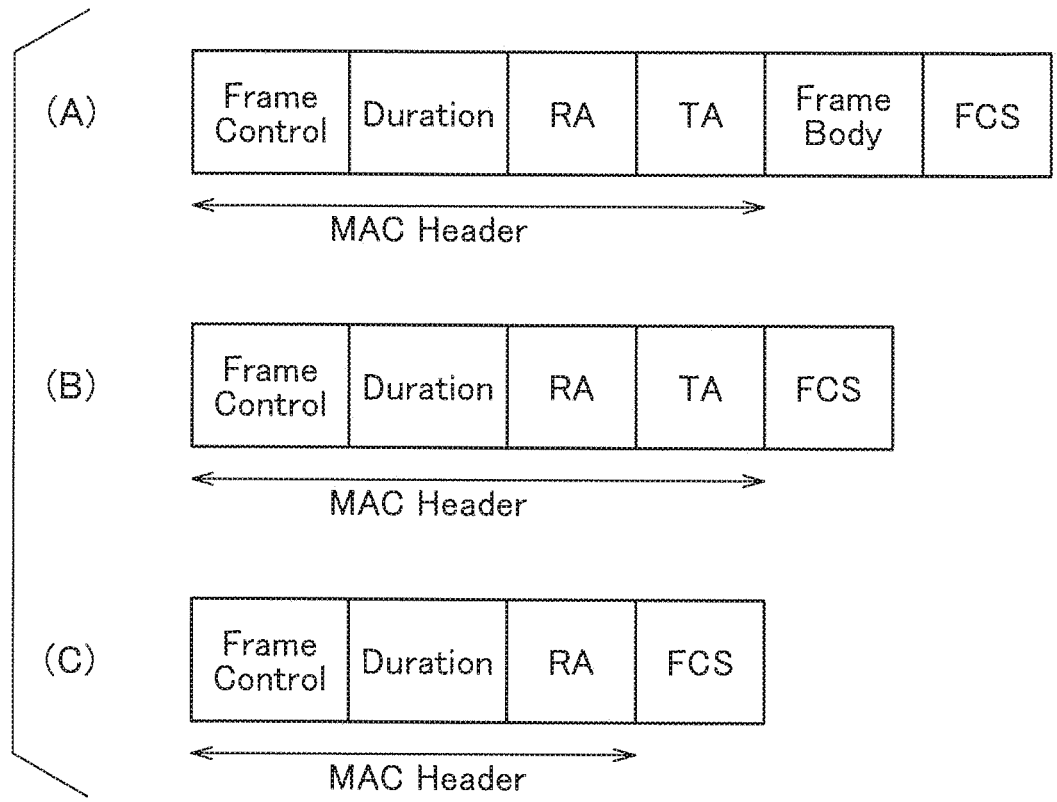
FIG. 3 show diagrams each showing an example of a frame format according to the first embodiment.

FIG. 3(A) shows an example of a basic format of a MAC frame (hereinafter a frame) used in this embodiment. Communication between the base station and the terminal is performed by transmitting and receiving MAC frames, in further detail, transmitting and receiving physical packets including MAC frames.

Figure 4:
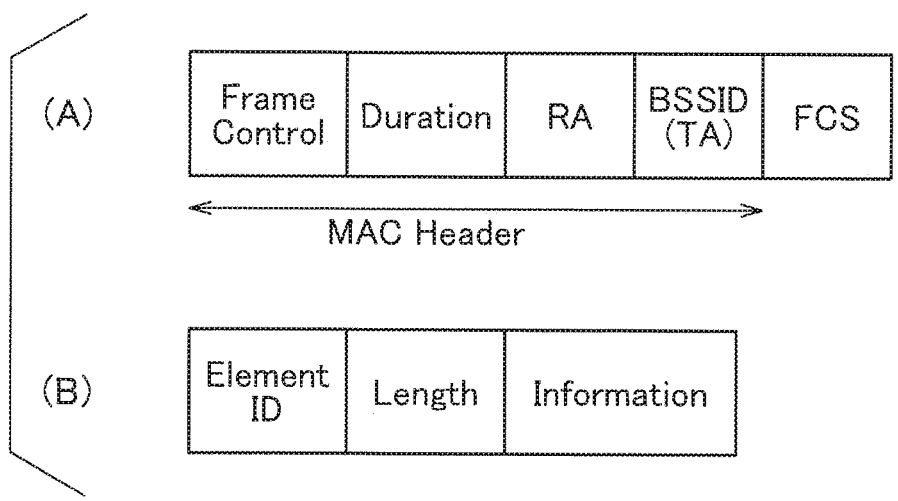
FIG. 4 show diagrams each showing another example of a frame format, and an example of a format of an information element.

The frame format in FIG. 3(A) includes fields which are a MAC header, a frame body, and FCS. A data frame, a management frame, and a control frame are based on this format. A field or some fields may be omitted or added from or to the format in some cases. For example, FIG. 3(B) shows an example of an RTS (Request to Send) frame, which is a control frame for requesting permission of transmission. In this format, the frame body field included in the format of the example in FIG. 3(A) is absent. FIG. 3C shows an example of a format of a CTS (Clear to Send) frame, which is a control frame for notifying permission of transmission. In this format, the frame body field and the TA (Transmitting STA Address) field included in the format of the example in FIG. 3(A) are absent. Furthermore, FIG. 4(A) shows an example of a format of CF (Contention Free)-End frame. In this format, the frame body field included in the format of the example in FIG. 3(A) is absent. In FIG. 3(A), fields that are typically included in the MAC frame but are not necessary to describe this embodiment are omitted and not shown.

Here, the management frame is a frame used to manage the communication link with another terminal. The examples include a beacon frame, an association request frame (association request frame for requesting association with the base station), and an association response frame (association response frame that is a response frame for the association response frame). Furthermore, there may be a newly defined management frame. The control frame is a frame used for control during transmission and reception (exchange) of the management frame and the data frame to and from another wireless communication device. The examples include an RTS frame, a CTS frame, an ACK (Acknowledgement) frame, and a BA (Block Ack) frame. The details of the data frame, the management frame, and the control frame are described later in other embodiments.

The "Frame Control" field is provided with a subfield that represents the type for discriminating three frame types which are the data frame, the management frame, and the control frame. To discriminating the further detailed frame types, the "Frame Control" field is provided with a subfield that represents the subtype.

In the case of the RTS frame, for example, the type has a value representing the control frame, and the subtype has a value defined for the RTS frame. Likewise, in the case of Block Ack (BA) frame that is a control frame, the type has a value representing the control frame, and the subtype has a value defined for the BA frame. In the case of a CF-End frame described later, the type has a value representing the control frame, and the subtype has a value defined for the CF-End frame. In the case of beacon frame that is a control frame, the type has a value representing the control frame, and the subtype has a value defined for the beacon frame. Likewise, in the association request frame, the association response frame and the like, the type and subtype values are set.

In the "Duration/ID" field, a medium reserved duration is set. Upon receipt of a frame addressed for another terminal (not for the own terminal), it is determined that the medium is virtually busy over the medium reserved duration. Such a scheme that virtually determines that the medium is busy or duration during which the medium is virtually regarded to be busy is called NAV (Network Allocation Vector).

In the RA (Receiving STA Address) field, the receiver address of the frame is set. For example, the destination of the RTS frame to be transmitted by the base station to the terminal is the terminal. Consequently, the address of this terminal is set in the RA field. The address of the terminal is the MAC address of the terminal, for example.

In the TA field, the address of the source of the frame is set. For example, the source of the RTS frame to be transmitted by the base station to the terminal is the base station. Consequently, the address of the base station is set as the source of the RTS frame. The address of the base station is the MAC address of the base station, for example. Instead of the MAC address, BSSID (typically having the same value as the MAC address) may be set.

Any data item for notifying the destination terminal or base station is set in the frame body field. In the case of the management frame, information to be inserted into the frame body field is managed as an information element. FIG. 4(B) shows an example of the format of the information element. The information element includes an "Element ID" field, a "Length" field, and an "Information" field. The "Element ID" stores a value for identifying the information element. The "Information" field (hereinafter, information field) stores information to be notified. The "Length" field stores the length of the information field. The frame body field of the management frame can store one or more information elements having such a configuration.

In the FCS field, FCS (Frame Check Sequence) information is set as a checksum symbol used for frame error detection on the reception side. An example of the FCS information is CRC (Cyclic Redundancy Code) or the like.

Figure 5:
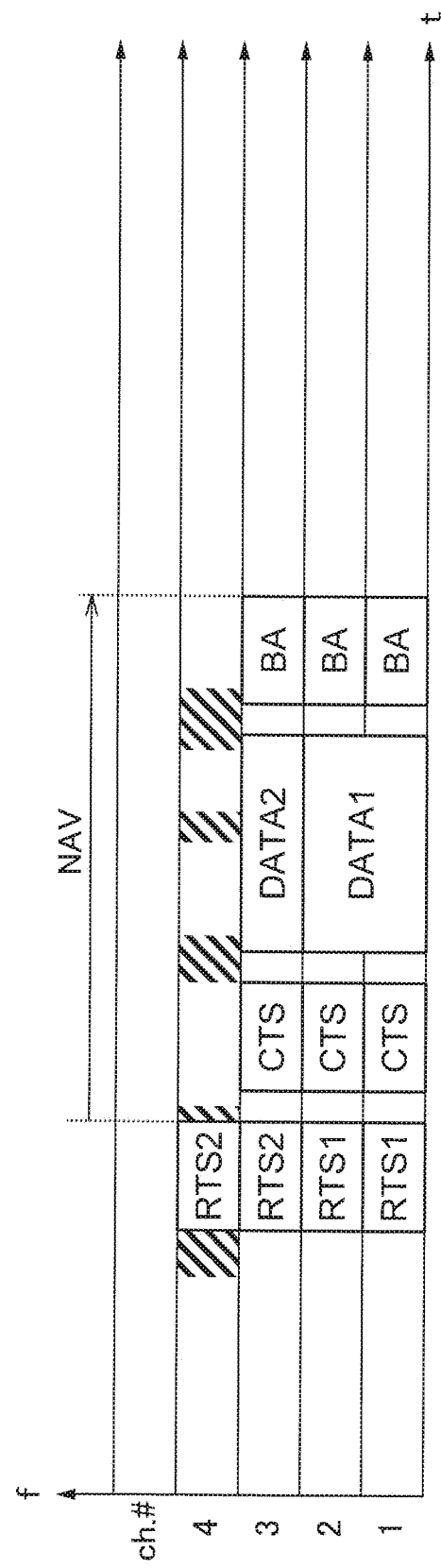
FIG. 5 is a diagram showing an example of an operation sequence according to the first embodiment.

FIG. 5 shows an example of an operation sequence pertaining to the MU-MC communication between the base station 11 belonging to BSS1 and multiple terminals. This example shows an example of a case where the MU-MC communication uses the channels 1 to 4. Alternatively, various cases that use the channels 1 to 8 or the channels 2 to 8 can be implemented. The MU-MC communication may use the system primary channel. Alternatively, the MU-MC communication does not necessarily use the system primary channel. Here, the channel used as the system primary channel is not specifically limited.

The sequence example of FIG. 5 shows the sequence in a case where the base station 11 has data items addressed for the terminals 1 and 2 in an internal buffer, and transmits these data items using the MU-MC communication. The horizontal axis indicates time. The vertical axis indicates the channels 1 to 4. The terminals 1 and 2 can execute the MU-MC communication, and the function of the MU-MC communication is enabled (on).

Rectangles with "RTS" represent RTS frames to be transmitted by the base station. A numeral on the right side of each "RTS" indicates the terminal number that is the destination of the RTS frame. For example, "RTS1" indicates the RTS frame addressed for the terminal 1. Rectangles with "CTS" represent CTS frames to be transmitted by the terminal. Frames with "DATA" represent data frames to be transmitted by the base station. A numeral on the right side of each "DATA" indicates the terminal number that is the destination of the data frame. For example, "DATA1" indicates the data frame addressed for the terminal 1. The data frame indicated by "DATA" may be one data frame, multiple data frames, or an aggregation frame (super frame) in which multiple data frames (subframes) are aggregated. The following description assumes the case of transmitting the aggregation frame. "BA" indicates a BA (Block Ack) frame to be transmitted by the terminal to the base station. The BA frame includes information representing the successfulness of one or more frames received from the base station. In a case where the base station transmits a single frame to the terminal, the terminal may return an ACK frame instead of the BA frame. Alternatively, a configuration may be adopted that returns a BA frame instead of the ACK frame in response to transmission of a single frame. In FIG. 5, hatched rectangles indicate signals to be transmitted by at least any one of the terminals 4 to 6 and the base station 19, which belong to BSS2. In this sequence example, the signals are interference signals, and are to be busy at carrier sensing. The interference signals are signals to be transmitted from the terminal or the base station which belong to BSS2, both of these parties, a legacy station belonging to the base station 11, or a combination thereof, for example.

The base station 11 determines transmission of the RTS frame in the channels 1 and 2 corresponding to the terminal 1 and the channels 3 and 4 corresponding to the terminal 2 to perform the MU-MC communication with the terminals 1 and 2. Thus, the base station 11 performs carrier sensing in the channels 1 to 4 during DIFS (distributed coordination function interframe space) time and randomly determined backoff time period, and confirms that the carrier-sensing result is idle, thereby obtaining the access right, that is, time allowed to occupy the medium, i.e., TXOP (Transmission Opportunity). The DIFS time is only an example. Alternatively, this time may be any other frame interval time only if the time is predetermined time. Also in the following description, the DIFS time does not mean any limitation thereto. Any other predetermined time can be used. The base station 11 transmits the RTS frame in the channel on which the access right has been obtained. It is herein assumed that the result of carrier sensing is idle in each of the channels 1 to 4. Thus, the base station 11 transmits the RTS frame to the terminal 1 in the channels 1 and 2, and transmits the RTS frame to the terminal 2 in the channels 3 and 4. The diagram shows that the signal from one of the terminals 4 to 6 and the base station is observed by the terminal 2 in the transmission time of the RTS frame and before and after the time. It is herein assumed that the signal is not detected by the base station 11. In the "Duration/ID" field of the RTS frame, the value of NAV for preventing transmission by the other terminals (medium reserved duration) is set. The terminal designated as RA of the RTS frame can transmit a CTS frame as a response. The value of NAV is an example of information for designating prevention of transmitting the frame other than the response. As to the example of the value of NAV, the time (1 ms etc.) assumed as the duration to completion of the frame sequence (reception of the CTS frame, transmission of the aggregation frame, and reception of the BA frame) is set.

The receiving STA address (RA) of the RTS frame to be transmitted in the channels 1 and 2 is the MAC address of the terminal, and the transmitting STA address (TA) is the MAC address of the base station. The RTS frames to be transmitted in the channels 1 and 2 are the frame (duplicate frame) having the same content. Transmission of frames having the same content is sometimes called duplicate transmission. The receiving STA address of the RTS frame to be transmitted to the terminal 2 in the channels 3 and 4 is the MAC address of the terminal 2, and the transmitting STA address is the MAC address of the base station. The RTS frames to be transmitted in the channels 3 and 4 are also the frames (duplicate frames) having the same content.

The terminal 1 performs a standby operation at least in the channels 1 and 2. The terminal 2 performs a standby operation at least in the channels 3 and 4. In a case where the channels to be used for the MU-MC communication have preliminarily been notified from the base station, the standby operation only in the notified channel is required. Such notification may be preliminarily performed through any frame, such as beacon frame or a newly defined management frame, or a control frame or a data frame. The terminal 3 performs the standby operation, for example, in the channels 1 to 4. The standby operation is to stand by in a state capable of receiving the frame transmitted from the base station 11. More specifically, the operation may include carrier sensing in the channel concerned. Furthermore, the operation may include setting the operations of the elements in the terminal so as to allow reception processes, such as reception and demodulation of the signal of the frame, to be performed in the channel concerned.

The terminals 1 and 2 receive the RTS frame transmitted from the base station 11 and transmit the CTS frame, during a fixed time (PIFS: point coordination function interframe space) before reception, in the channel whose carrier-sensing result is idle. The CTS frame is transmitted SIFS (short interframe space) time after receipt of the RTS frame. The SIFS time is only an example. Alternatively, this time may be any other frame interval time only if the time is predetermined time. Likewise, the PIFS time is only an example. Alternatively, this time may be any other frame interval time only if the time is predetermined time. Also in the following description, the SIFS time or PIFS time do not mean any limitation thereto. Any other predetermined time can be used.

The terminal 1 receives the RTS frames in the channels 1 and 2, and the carrier-sensing result is idle during the fixed time (PIFS) before reception. Consequently, the terminal 1 transmits the CTS frames in the channels 1 and 2. The terminal 2 receives the RTS frame in the channel 3, and the carrier-sensing result is idle during the fixed time (PIFS) before reception. Consequently, the terminal 2 transmits the CTS frame in the channel 3. In the channel 4, the RTS frame has not been received (e.g., FCS indicates a failure in reception) or there has been a channel that is busy during the PIFS time before reception. Consequently, no CTS frame is returned in the channel 4. The receiving STA address (RA) of the CTS frame to be transmitted from each of the terminals 1 and 2 are the MAC address of the base station. The RTS frames transmitted from the base station in the channels 1 to 4 can be received by other terminals (terminals other than the terminals 1 and 2) that are performing the standby operation in the channels 1 to 4 in the BSS1 of the base station 11. Here, the terminal 3 can receive the RTS frames in the channels 1 to 4. The terminal 3 sets NAV in the channels 1 to 4 in which the RTS frames addressed not for this terminal have been received, on the basis of the medium reserved duration set in the "Duration/ID" field of the RTS frame. The terminal 1 also performs the standby operation in the channels 3 and 4. When the RTS frames are received in the channels 3 and 4, the NAV is set in these channels 3 and 4. Likewise, the terminal 2 also performs the standby operation in the channels 1 and 2. When the RTS frames are received in the channels 1 and 2, the NAV is set in these channels 1 and 2.

The base station transmits aggregation frames that each include one or more data frames, in the channels where the CTS frames have been received, SIFS-time after receipt of the CTS frames. Here, the base station 11 has received the CTS frames from the terminal 1 in the channels 1 and 2, and has received the CTS frame from the terminal 2 in the channel 3. Consequently, the base station 11 simultaneously transmits the aggregation frames to the terminal 1 in the channels 1 and 2, and the aggregation frame to the terminal 2 in the channel 3. It is assumed that the length of time for transmission of the aggregation frame is preliminarily determined. Instead of the aggregation frame, one or more data frames may be transmitted. As to the transmission in the channel 1 and 2, the frames may be separately transmitted in the channels 1 and 2. Alternatively, the channels 1 and 2 may be bundled into one band, in which the frame may be transmitted. The transmitting STA address (TA) of the aggregation frame to be transmitted to the terminal 1 is the MAC address of the base station, and the receiving STA address (RA) is the MAC address of the terminal 1. The transmitting STA address (TA) of the aggregation frame to be transmitted to the terminal 2 is the MAC address of the base station, and the receiving STA address (RA) is the MAC address of the terminal 2. The multiple frames to be transmitted by the base station to the multiple terminals may be identical to or different from each other. As to general representation, in a case of representation that the base station transmits or receives multiple frames or multiple X-th frames, these frames or X-th frames may be identical to or different from each other. Any value may be substituted into X according to the situations.

The terminals 1 and 2 each determine whether reception has succeeded, on the basis of the FCS of the aggregation frame received from the base station, and return the BA frame in the successful channel SIFS-time after receipt of the aggregation frame. Here, the terminal 1 has succeeded receipt of the aggregation frames in both the channels 1 and 2. Consequently, this terminal returns the BA frames in both the channels 1 and 2. In a case of receipt of the aggregation frame through use of the band in which the channels 1 and 2 are combined, the BA frame may be returned using the band in which the channels 1 and 2 are combined. The terminal 2 also has succeeded in receipt of the aggregation frame in the channel 3. Consequently, this terminal returns the BA frame in the channel 3. In a case of receipt of one data frame instead of the aggregation frame, the ACK frame may be transmitted instead of the BA frame.

According to the aforementioned sequence, in the channel 4, the CTS frame is not transmitted from the terminal 2. The terminal having received the RTS frame transmitted from the base station typically has a scheme where if the CTS frame has not been received SIFS-time after receipt of the RTS frame, the NAV is cancelled at this time point or a predetermined time period after receipt of the CTS frame. In the case of NAV cancellation, there is a possibility that the terminal transmits the frame to the base station. For example, it can be considered that while the base station 11 transmits the aggregation frames to the terminals 1 and 2, the terminal having cancelled the NAV starts frame transmission to the base station 11. In this case, if the base station 11 does not support full duplex communication that simultaneously performs uplink communication and downlink communication, this base station cannot receive the uplink signal from the terminal. The terminals cannot communicate with the base station 11 at least until completion of downlink MU-MC communication between the base station 11 and the terminals 1 and 2. Consequently, the transmission of the terminal uselessly consumes power. Thus, the terminal (here the terminal 3) in this embodiment does not cancel the NAV even in a case where the CTS frame is not to be received SIFS-time after receipt of the RTS frame. That is, irrespective of whether the CTS frame has been received, the NAV is kept during the time designated in the "Duration/ID" field in the RTS frame. This can eliminate the useless transmission operation by the terminal 3, and reduce the power consumption. The terminal 3 cancels the NAV when the time set in the "Duration/ID" field has elapsed after the completion of receipt of the RTS frame.

As described above, not only the channel-based OFDMA (MU-MC scheme) but also the resource-unit-based OFDMA can implement a similar sequence. In this case, the RTS frame, CTS frame, aggregation frame, BA frame and the like are transmitted and received on the resource unit basis instead of the channel basis. In the case of resource-unit-based OFDMA, carrier sensing is performed on the channel basis. In the channel whose carrier-sensing result is idle, all the resource units belonging to the channel concerned may be determined to be idle. In the busy channel, all the resource units belonging to the channel concerned may be determined to be busy. It is a matter of course that in a case where carrier sensing in the resource unit basis is allowed, the determination of whether the state is idle or busy may be made on each of the resource units.

Figure 6:
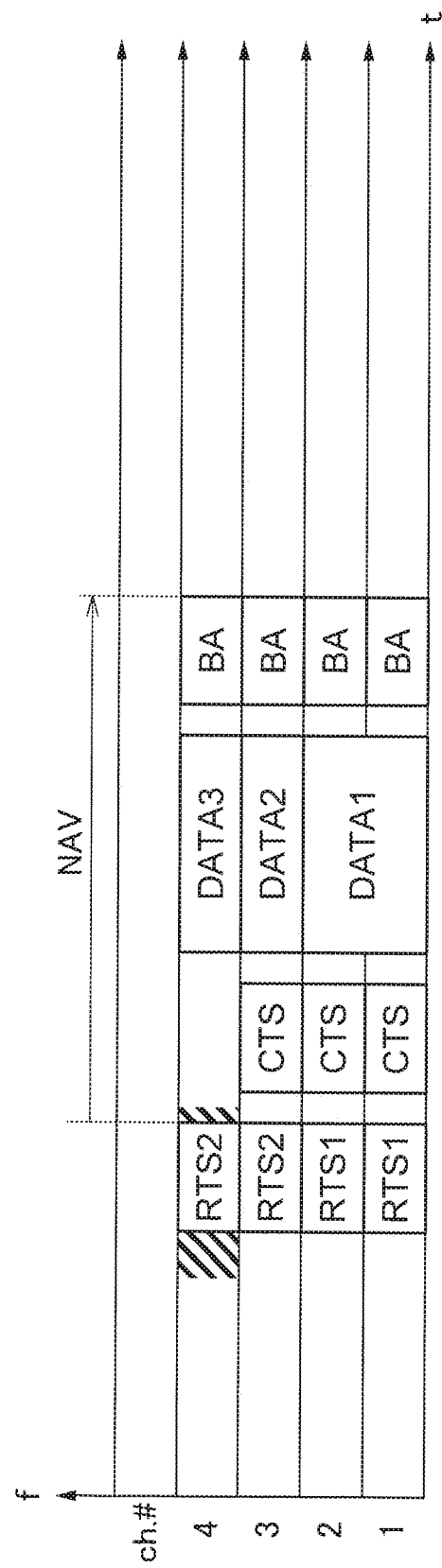
FIG. 6 is a diagram showing another example of an operation sequence according to the first embodiment.

The sequence of FIG. 5 does not cancel the NAV even when the CTS frame is not received. Unnecessary transmission operations by the terminal 3 are thus prevented. Here, the base station 11 performs downlink data transmission in the channel where the NAV is set during the NAV period, thereby allowing the channel concerned to be effectively used. FIG. 6 shows an example of the sequence in this case.

The difference from FIG. 5 is that even if the base station 11 does not receive the CTS frame in the channel 4, this base station transmits the aggregation frame (or one or more data frames) to the terminal 3 in the channel 4 simultaneously with the aggregation frame to be transmitted in the channels 1 to 3. That is, not only in the channels 1 to 3, but also in the channel 4, the aggregation frame is transmitted to the terminal 3, SIFS-time after receipt of the CTS frames in the channels 1 to 3. It is assumed that the channel 3 is preliminarily designated to perform at least the standby operation in all or some of the channels (here the channels 1 to 4) for MU-MC communication, and the terminal 3 is performing the standby operation at least in the channel 4. Such designation may be preliminarily performed through any frame, such as a beacon frame or a newly defined management frame, or a control frame or a data frame. The terminal 3 thus receives the RTS frame in the channel 4. If the CTS frame is not received SIFS-time after the receipt, this terminal keeps (maintains) the NAV as it is according to this embodiment as described above. The base station 11 preliminarily selects the terminal (here the terminal 3) from among the terminals standing by in at least the channel 4, and transmits the aggregation frame to the selected terminal 3. As the terminal 3 keeps the NAV, spontaneous transmission is prohibited or prevented. Reception of a frame and transmission of a response frame to this frame are allowed. The terminal 3 receives the aggregation frame transmitted from the base station 11, and returns the BA frame when the SIFS time elapses. Thus, the channel 4 can be effectively utilized, thereby allowing the system efficiency to be improved. Alternatively, if the terminal 3 does not receive the CTS frame, the NAV may be cancelled, and receipt of the frame from the base station 11 may be waited for. The BA frame may be returned when the SIFS time elapses, in response to the aggregation frame received from the base station 11. There may be a case where the terminal 3 cannot normally receive the frame owing to radio wave environments or the like. However, successful receipt can improve the system efficiency accordingly.

The frame described in this embodiment is not limited to what is called a frame in IEEE 802.11 standard, for example, and may indicate what is called a packet, instead.

Figure 7:
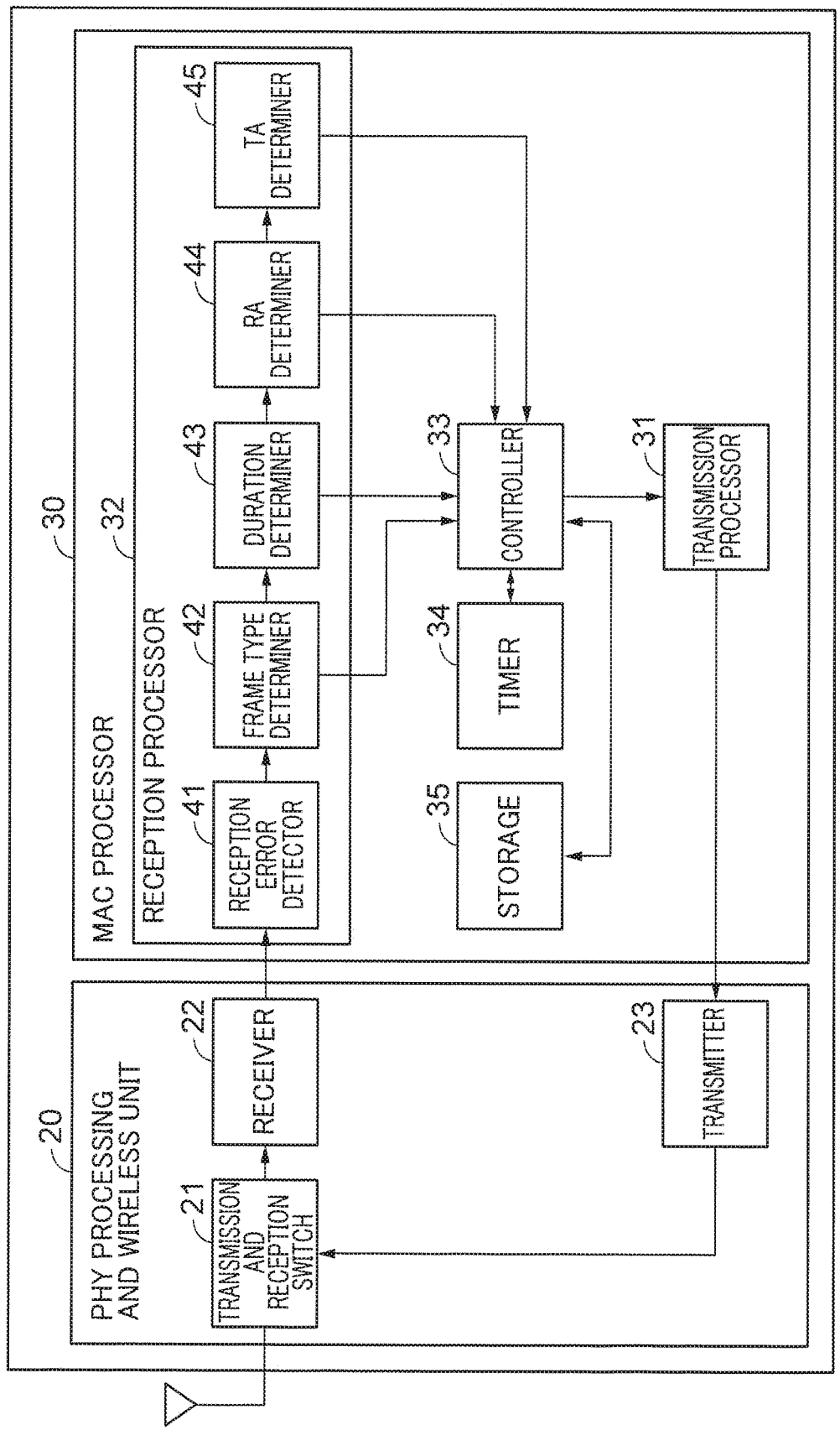
FIG. 7 is a block diagram of a terminal-mounted wireless communication device according to the first embodiment.

FIG. 7 is a block diagram of a terminal-mounted wireless communication device according to the first embodiment.

The wireless communication device of the terminal includes one or more antennas, a PHY processing and wireless unit 20, and a MAC processor 30. The PHY processing and wireless unit 20 includes a transmission and reception switch 21, a receiver 22, and a transmitter 23. The MAC processor 30 includes a transmission processor 31, a reception processor 32, a controller 33, a timer 34, and a storage 35. The reception processor 32 includes a reception error detector 41, a frame type determiner 42, a duration determiner 43, an RA determiner 44, and a TA determiner 45. An integrated circuit for wireless communication according to this embodiment corresponds to the MAC processor 30, or the combination of the MAC processor 30 and the PHY processing and wireless unit 20, for example.

The transmission and reception switch 21 connects the antenna to any one of the receiver 22 and the transmitter 23 on the basis of the designation by the controller 33. In reception, connection of the antenna to the receiver 22 allows the signal received via the antenna to be input into the receiver 22. In transmission, connection of the antenna to the transmitter 23 allows the signal output from the transmitter 23 to be transmitted via the antenna.

The receiver 22 converts the signal received via the antenna, from a radio frequency into the baseband, and extracts a signal in the channel concerned. The channel in which the signal is to be extracted is designated by the controller 33. The receiver 22 can extract the signal in the channel basis or in the band in which multiple channels are bundled, and perform the reception process. For example, in a case where the terminal can support eight channels at the maximum, the channels are separated into individual channels, and the signals are extracted. Analog filters may be provided for the respective channels, and the signals in the bands may be extracted through the analog filters. Alternatively, one or more analog filters that cover all or multiple channels may be provided, the signals extracted through the analog filters may be processed through a digital filter, and the signals in the respective channels may be extracted. The analog filter may have an operating band that is variable according to designation by the controller 33, or may be capable of supporting only signals in a preliminarily fixed band. The receiver 22 applies reception processes to the extracted signal to obtain the frame, and outputs the frame to the reception processor 32. The reception processes include, for example, A/D conversion, demodulation process, and physical layer processing, such as physical header analysis. A circuit that includes elements covering processes of and before the A/D conversion or before the A/D conversion among the reception processes performed by the receiver 22 corresponds to RF (Radio Frequency) integrated circuit, for example.

The MAC processor 30 corresponds to a baseband integrated circuit that controls communication, or a control processor. The entire or a part of a digital domain process of each element in the MAC processor 30 may be performed by software (program) operated in a processor, such as a CPU, by hardware, or by both the software and hardware. The terminal may include a processor that performs processes of all or some of the elements.

The reception processor 32 analyzes the MAC header of the frame input from the receiver 22. The reception error detector 41 of the reception processor 32 performs error check (CRC check) or the like on the basis of the value of the FCS field of the frame input from the receiver 22. In a case with error detection, it is determined that the frame has not been normally received, and the frame concerned is discarded. In a case without error detection, it is determined that the frame has been normally received, and the frame concerned is output to the frame type determiner 42.

The frame type determiner 42 determines the frame type on the basis of the type and subtype of the "Frame Control" field of the frame. For example, the classification of the frame to any of the management frame, the control frame and the data frame is determined according to the type. Alternatively, in the determined frame type, further detailed type is determined according to the subtype. Thus, in the case of the management frame, classification is performed among the beacon frame, the association request frame, the association response frame, and a newly defined frame. In the case of the control frame, classification is performed among the RTS frame, the CTS frame, the BA frame, and the ACK frame.

The duration determiner 43 determines the value of NAV (Network Allocation Vector) on the basis of the medium reserved duration set in the "Duration/ID" field of the frame.

The RA determiner 44 determines the destination of the frame on the basis of the RA field of the frame. When the value of the RA field coincides with the MAC address of the own terminal, the frame is determined as a frame addressed for the own terminal. In the case of the broadcast address or the multicast address, the frame is also determined as a frame addressed for the own terminal. In cases without coincidence with these addresses, the frame is determined as a frame addressed for another terminal or another station.

The TA determiner 45 determines the transmitter of the frame on the basis of the TA field of the frame. For example, in a case where the value of the TA field coincides with the MAC address of the base station 11 or BBSID, the transmitter of the frame concerned is determined as the base station 11. The terminal preliminarily grasps the MAC address of the base station 11 by receiving the beacon frame or the like.

In the case where the received frame is a data frame addressed for the own terminal on the basis of the analysis result of the MAC header of the received frame, the data frame is output to an upper processor, not shown, as necessary. In the case where the received frame is the management frame or the control frame, the frame is output to the controller 33. According to whether the received frame is a frame requiring an acknowledgement response and whether the frame has successfully been received, a designation of generating the frame (acknowledgement response frame) representing the acknowledgement response is output to the access controller 33 or directly output to the transmission processor 31. The acknowledgement response frame may be the ACK frame, the BA frame, etc. The BA frame is used upon receipt of the aggregation frame. In the BA frame, information is included that represents the successfulness of each frame included in the aggregation frame.

The reception processor 32 manages carrier sensing information through the receiver 22. The carrier sensing information includes a physical carrier sensing information that is to be input from the PHY processing and wireless unit 20 and pertains to the busy and idle states of a medium (CCA), and a virtual carrier sensing information based on the "Duration/ID" value (medium reserved duration) described in the "Duration/ID" field of the received frame. When one of the pieces of carrier sensing information indicates the busy state, the medium is regarded to be busy, and signal transmission is prevented during this period. Upon receipt of a frame addressed for another terminal (i.e., not for the own terminal), the reception processor 32 determines that the medium is virtually busy over the medium reserved duration described in the frame. Such a scheme that virtually determines that the medium is busy or a virtual medium busy duration is called NAV (Network Allocation Vector). The reception processor 32, the receiver 22, or both of them may include a carrier detector that detects a carrier.

The storage 35 stores information to be transmitted to the base station, or information received from the base station. The storage 35 can be read and written by the controller 33. The storage 35 is provided outside of the controller 33. Alternatively, a part or the entire storage 35 may be provided as a buffer in the controller 33, or provided outside of the MAC processor. The storage 35 may be a memory, an SSD (Solid State Drive), a hard disk or the like. In the case where the storage 35 is a memory, this memory may be a volatile memory, such as DRAM, or a nonvolatile memory, such as NAND or MRAM.

The controller 33 manages channel access, and controls frame transmission at desired timing. To transmit the frame at desired timing, a timer 34 is used. Duration to the time at desired timing is set in the timer 34. At the timeout of the timer 34, frame transmission is executed. Furthermore, the timer 34 may be used for determining whether the frame is received at desired timing, and for determining a lapse of desired time period. According to an example of operation, the controller 33 controls so as to prevent transmission until lapse of the NAV period in a case where the received frame is the RTS frame and the destination of the RTS frame is another terminal. In this case, even if the CTS frame is not received in the same channel as the channel in which the RTS frame has been transmitted SIFS-time after receipt of the RTS frame, the NAV is not cancelled. Thus, uplink transmission is avoided while the uplink signal cannot be received because the base station performs downlink MU-MC communication.

The transmission processor 31 generates and transmits the frame according to an instruction by the controller 33. Upon designation of frame transmission by the controller 33, the transmission processor 31 generates the designated frame, and outputs the generated frame to the transmitter 23 of the PHY processing and wireless unit 20.

The transmitter 23 applies a desired physical layer process to the frame input from the transmission processor 31 to obtain a physical packet. This transmitter then applies DA (Digital-Analog) conversion, frequency conversion and the like to the physical packet to obtain an analog signal, and transmits the signal as radio waves through the antenna to the air. A circuit that covers processes of and after the D/A conversion or after the D/A conversion among the transmission processes performed by the transmitter 23 corresponds to RF (Radio Frequency) integrated circuit, for example.

Information that pertains to the channel and is to be processed by the transmitter 23 and the receiver 22 is managed by the controller 33. The controller 33 allocates, to the transmitter 23 and the receiver 22, a channel that is to be processed, and designates the allocated channel for the transmitter 23 and the receiver 22. The transmitter 23 and the receiver 22 process the channel designated by the controller 33.

The terminal can execute the MU-MC communication, and may notify that the function of MU-MC communication is enabled (on), to the base station through a frame, at the time of association or any timing thereafter. The base station may recognize the terminal having issued the notification, as a terminal capable of MU-MC communication.

Figure 8:
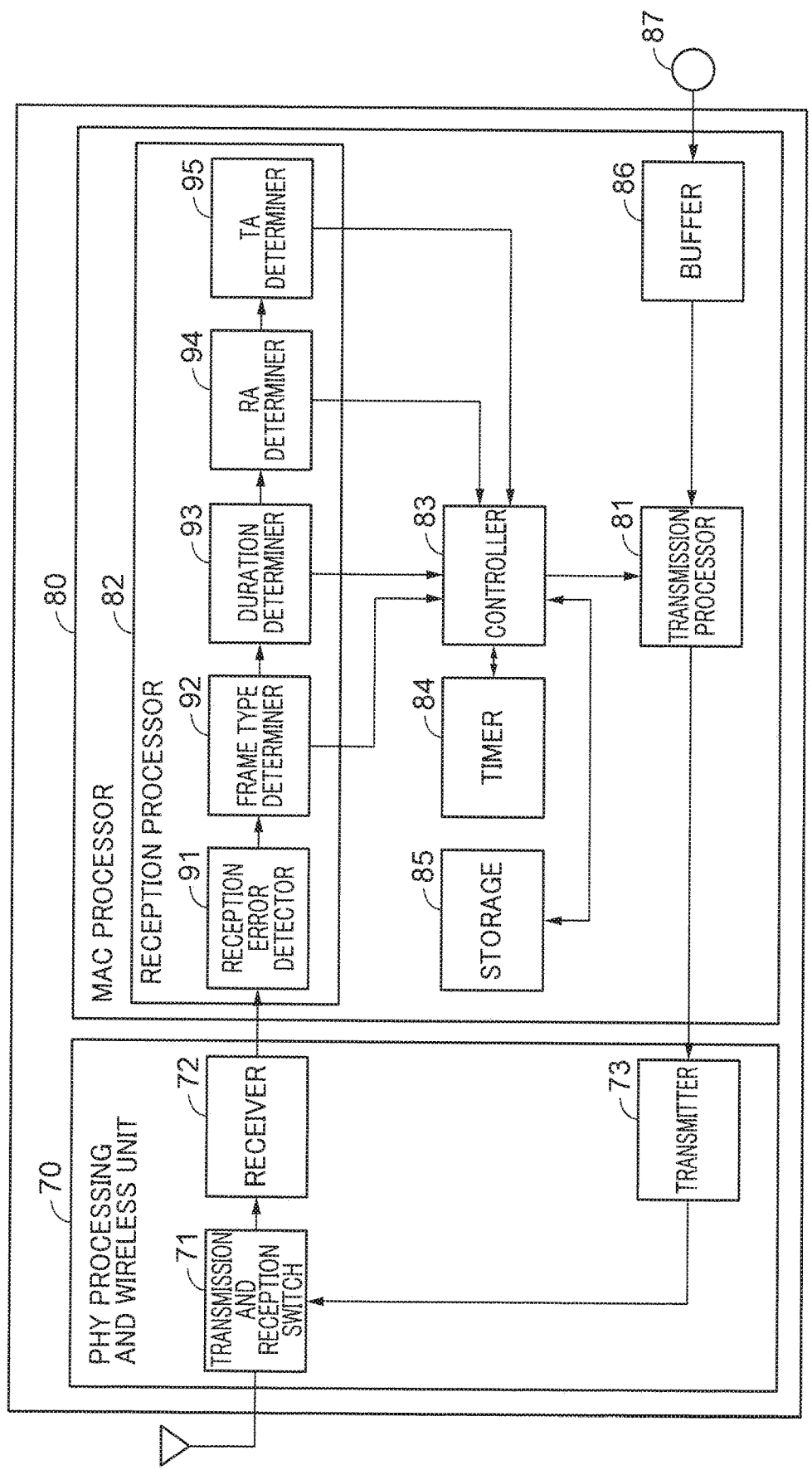
FIG. 8 is a block diagram of a base-station-mounted wireless communication device according to the first embodiment.

FIG. 8 is a functional block diagram of a base-station-mounted wireless communication device according to the first embodiment.

The wireless communication device of the base station includes one or more antennas, a PHY processing and wireless unit 70, and a MAC processor 80. The PHY processing and wireless unit 70 includes a transmission and reception switch 71, a receiver 72, and a transmitter 73. The MAC processor 80 includes a transmission processor 81, a reception processor 82, a controller 83, a timer 84, a storage 85, and a buffer 86. The reception processor 82 includes a reception error detector 91, a frame type determiner 92, a duration determiner 93, an RA determiner 94, and a TA determiner 95. An integrated circuit for wireless communication according to this embodiment corresponds to the MAC processor 80, or the combination of the MAC processor 80 and the PHY processing and wireless unit 70, for example.

The transmission and reception switch 71 connects the antenna to any one of the receiver 72 and the transmitter 73 on the basis of the designation by the controller 83. In reception, connection of the antenna to the receiver 72 allows the signal received via the antenna to be input into the receiver 72. In transmission, connection of the antenna to the transmitter 73 allows the signal output from the transmitter 73 to be transmitted via the antenna.

The receiver 72 converts the signal received via the antenna, from a radio frequency into the baseband, and extracts a signal in the channel concerned from the baseband signal. The channel in which the signal is to be extracted is designated by the controller 83. The receiver 72 can extract the signal in the channel basis or in the band in which multiple channels are bundled, and perform the reception process. For example, in a case where the base station can support eight channels at the maximum, the channels are separated into individual channels, and the signal is extracted. Analog filters may be provided for the respective channels, and the signals in the bands may be extracted through the analog filters. Alternatively, one or more analog filters that cover all or multiple channels may be provided, the signals extracted through the analog filters may be processed through a digital filter, and the signals in the respective channels may be extracted. The analog filter may have an operating band that is variable according to designation by the controller 83, or may be capable of supporting only signals in a preliminarily fixed band. The receiver 72 applies various processes to the extracted signal to obtain the frame, and outputs the frame to the reception processor 82. The various processes include, for example, A/D conversion, demodulation process, and physical layer processing, such as physical header analysis. A circuit that covers processes of and before the A/D conversion or before the A/D conversion among the reception processes performed by the receiver 72 corresponds to RF (Radio Frequency) integrated circuit, for example.

The MAC processor 80 corresponds to a baseband integrated circuit that controls communication, or a control processor. The entire or a part of a digital domain process of each element in the MAC processor 80 may be performed by software (program) operated in a processor, such as a CPU, by hardware, or by both the software and hardware. The base station may include a processor that performs processes of all or some of the elements.

The reception processor 82 analyzes the MAC header of the frame input from the receiver 72. The reception error detector 91 of the reception processor 82 performs error check (CRC check) or the like on the basis of the value of the FCS field of the frame input from the receiver 72. In a case with error detection, it is determined that the frame has not been normally received, and the frame concerned is discarded. In a case without error detection, it is determined that the frame has been normally received, and the frame concerned is output to the frame type determiner 92.

The frame type determiner 92 determines the frame type on the basis of the type and subtype of the "Frame Control" field of the frame. For example, the classification of the frame to any of the management frame, the control frame and the data frame is determined according to the type. Alternatively, in the determined frame type, further detailed type is determined according to the subtype.

The duration determiner 93 determines the value of NAV (Network Allocation Vector) on the basis of the medium reserved duration set in the "Duration/ID" field of the frame.

The RA determiner 94 determines the destination of the frame on the basis of the RA field of the frame. When the value of the RA field coincides with the MAC address of the own station, the frame is determined as a frame addressed for the own station. Also in the case of the broadcast address or the multicast address, the frame is also determined as a frame addressed for the own station. In cases without coincidence with these addresses, the frame is determined as a frame addressed for another terminal or another station.

The TA determiner 95 determines the transmitter of the frame on the basis of the TA field of the frame.

In the case where the received frame is a frame addressed for the own station on the basis of the analysis result of the MAC header of the received frame, the data frame is output to an upper processor, not shown, as necessary. In the case where the received frame is the management frame or the control frame, the frame is output to the controller 83. According to whether the received frame is a frame requiring an acknowledgement response and whether the frame has successfully been received, a designation of generating the frame (acknowledgement response frame) representing the acknowledgement response is output to the access controller 83 or directly output to the transmission processor 81. The acknowledgement response frame may be the ACK frame, the BA frame and the like. The BA frame is used upon receipt of the aggregation frame or the like. In the BA frame, information is included that represents the successfulness of each frame included in the aggregation frame. When the received frame is determined as a data frame addressed for another terminal, a relay process and the like are performed as necessary.

The reception processor 82 manages carrier sensing information through the receiver 72. The carrier sensing information includes a physical carrier sensing information that is to be input from the PHY processing and wireless unit 70 and pertains to the busy and idle states of a medium (CCA), and a virtual carrier sensing information based on the "Duration/ID" value (medium reserved duration) described in the "Duration/ID" field of the received frame. When one of the pieces of carrier sensing information indicates the busy state, the medium is regarded to be busy, and signal transmission is prevented during this period. Upon receipt of a frame addressed for another terminal (i.e., not for the own station), the reception processor 82 determines that the medium is virtually busy over the medium reserved duration described in the frame. Such a scheme that virtually determines that the medium is busy or a virtual medium busy duration is called NAV (Network Allocation Vector). The reception processor 82, the receiver 72, or both of them may include a carrier detector that detects a carrier.

The storage 85 stores information to be transmitted to the terminal, or information received from the terminal. The storage 85 can be read and written by the controller 83. The storage 85 is provided outside of the controller 83. Alternatively, a part or the entire storage 85 may be provided as a buffer in the controller 83, or provided outside of the MAC processor. The storage 85 may be a memory, an SSD, a hard disk or the like. In the case where the storage 85 is a memory, this memory may be a volatile memory, such as DRAM, or a nonvolatile memory, such as NAND or MRAM.

The buffer 86 is connected to an upper layer via an input terminal 87. An upper layer stores, in this buffer, data to be transmitted. The buffer 86 may be a device identical to or different from the storage 85. The buffer 86 may be a memory, an SSD, a hard disk or the like. In the case where the buffer 86 is a memory, this memory may be a volatile memory, such as DRAM, or a nonvolatile memory, such as NAND or MRAM. Also in the wireless communication device of the terminal in FIG. 7, a buffer similar to the buffer 86 may be included.

The controller 83 manages channel access, and controls frame transmission at desired timing. To transmit the frame at desired timing, a timer 84 is used. Duration to the time at desired timing is set in the timer 84. At the timeout of the timer 84, frame transmission is executed. Furthermore, the timer 84 may be used for determining whether the frame is received at desired timing, and for determining whether a desired time period has elapsed.

The controller 83 includes an allocator that allocates channels to multiple terminals for MU-MC communication. The controller 83 can execute the MU-MC communication, and may receive a frame for notifying that the MU-MC communication is enabled, from the terminal whose function of MU-MC communication is enabled (on), at the time of association or any timing thereafter. The controller 83 may recognize the terminal having issued the notification, as a terminal capable of MU-MC communication.

The controller 83 allocates channels to multiple terminals using the allocator. The controller 83 manages the channels allocated to the channels. The controller 83 may allocate the channels to the terminals according to any method. For example, information for identifying channels to be requested for use may be received from the terminals, and the channels may be allocated to the terminals on the basis of the information. Basically, the channels are allocated to the terminals so as not to overlap. Alternatively, the same channels may be allocated to the terminals in an overlapping manner. It is only required not to use channels overlapping among the terminals in an actual MU-MC communication. The channels to be allocated to the terminals may be determined on the basis of the amounts of data addressed for the terminals. It is a matter of course that the channels can be allocated according to a method other than that described here.

The controller 83 may transmit frames that include information for notifying the channels allocated to the terminals via the transmission processor 81. The information may be notified through any of the association response frame, beacon frame, management frame, and other management frame. The controller 83 may regard, as a trigger, presence of data addressed for multiple terminals in the buffer 86, and may determine start of MU-MC communication in response to the trigger.

As an example of an operation, it is assumed that in the MU-MC communication, the controller 83 transmits the RTS frame in a certain channel (assumed as channel A), and simultaneously transmits the RTS frame in another channel (assumed as channel B). The destinations of the RTS frames A and B may be identical to or different from each other. It is assumed that SIFS-time after transmission, the CTS frame is received in the channel A, and no CTS frame is received in the channel B. At this time, the controller 83 performs control to transmit, in the channel A, a frame such as a data frame having a destination identical to that of the RTS frame having been transmitted in the channel A, SIFS-time after receipt of the CTS frame in the channel A, and to transmit, in the channel B, a frame such as a data frame having a destination different from that of the RTS frame having been transmitted in the channel B. As the terminal serving as the destination of transmission in the channel B, at least a terminal performing the standby operation in the channel B is selected from among the terminals connected to the base station. In some cases, the terminal to be selected may be the same terminal as that serving as the destination of frame transmission in the channel A. In a case of presence of multiple candidate terminals, the terminal may be selected according to any of methods that include random selection, and selection of the terminal having the maximum amount of data to be transmitted.

The transmission processor 81 generates and transmits the frame according to an instruction by the controller 83. Upon designation of frame transmission by the controller 83, the transmission processor 81 generates the designated frame, and outputs the generated frame to the transmitter 73 of the PHY processing and wireless unit 70. The transmission processor 81 may generate a frame using data in the buffer 86.

The transmitter 73 applies a desired physical layer process to the frame input from the transmission processor 81 to obtain a physical packet. This transmitter then applies DA (Digital-Analog) conversion and frequency conversion to the physical packet to obtain an analog signal, and transmits the signal as radio waves through the antenna to the air. A circuit that covers processes of and after the D/A conversion or after the D/A conversion among the transmission processes performed by the transmitter 73 corresponds to RF (Radio Frequency) integrated circuit, for example.

Information that pertains to the channel and is processed by the transmitter 73 and the receiver 72 is managed by the controller 83. The controller 83 allocates, to the transmitter 73 and the receiver 72, a channel that is to be processed, and designates the allocated channel for the transmitter 73 and the receiver 72. The transmitter 73 and the receiver 72 process the channel designated by the controller 83.

Figure 9:
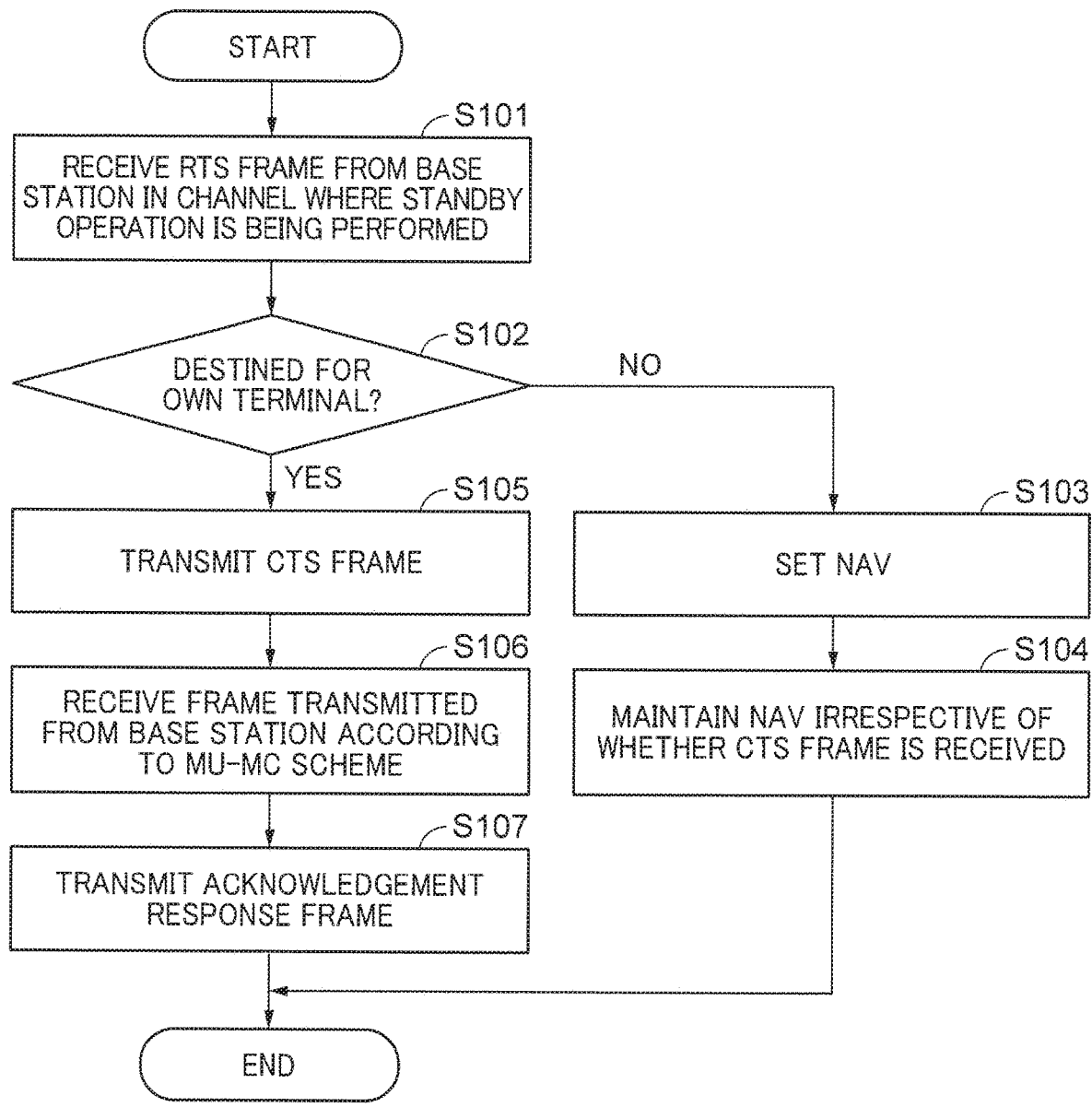
FIG. 9 is a diagram showing a flowchart of an operation of a terminal according to the first embodiment.

FIG. 9 is a diagram showing a flowchart of an operation of a terminal according to the first embodiment.

The terminal performs the standby operation in at least one predesignated channel, and receives the RTS frame from the base station in the channel where the standby operation is being performed (S101). The terminal determines whether the RTS frame is addressed for the own terminal (S102). When the RTS frame is not addressed to the own terminal, that is, is addressed for another terminal, the terminal sets NAV on the basis of the medium reserved duration set in the "Duration/ID" field of the RTS frame (S103). The terminal keeps (maintains) the set NAV until timeout (S104). That is, even if the CTS frame is not received SIFS-time after receipt of the RTS frame, in the channel where the RTS frame has been received, the NAV is kept.

In step S102, when the RTS frame is addressed for the own terminal and the carrier-sensing result in the PIFS time which is before receipt of the RTS frame is idle, the CTS frame is transmitted in the channel where the RTS frame has been received, SIFS-time after receipt of the RTS frame (S105). The terminal receives the frame (one or more data frames, an aggregation frame or the like) transmitted from the base station according to the MUMC scheme using the channel concerned SIFS-time after transmission of the CTS frame (S106). The terminal transmits the acknowledgement response frame (the BA frame, ACK frame or the like) SIFS-time after receipt of the frame (S107).

Here, in a case where the RTS frame is not addressed for the base station in step S101 and where the CTS frame is not received from SIFS-after receipt of the RTS frame, the NAV may be cancelled. It may be determined whether the RTS frame is addressed for the base station on the basis of the TA field of the RTS frame or the like. For example, normal communication different from the MU-MC communication may be a possible case where a certain terminal (terminal A) which is not the base station, transmits the RTS frame addressed for the base station in a channel, such as the primary channel, for the sake of data transmission. The RTS frame is received by another terminal (terminal B). Since the RTS frame is not addressed to the own terminal, the NAV is set. If the CTS frame is not received from the base station SIFS-time after receipt of the RTS frame, the NAV in the channel concerned is cancelled in midstream. In this case, cancellation of the NAV does not cause the problem as described above. In view of system efficiency, it is desired to cancel the NAV to thereby allow the channel to be available. However, in a case where the terminal A is capable of downlink data transmission according to the MU-MC scheme in a manner similar to that of the base station and performs RTS frame transmission in MU-MC communication, processes similar to those of the base station may be performed. The address of such a terminal is preliminarily grasped as with the case of the base station. When the transmitter address of the RTS frame coincides with the preliminarily grasped address of the communication device, the NAV is kept (maintained) as in step S104. On the contrary, when these addresses do not coincide with each other, the NAV may be cancelled in a case where the CTS frame is not received SIFS-time after receipt of the RTS frame.

Figure 10:
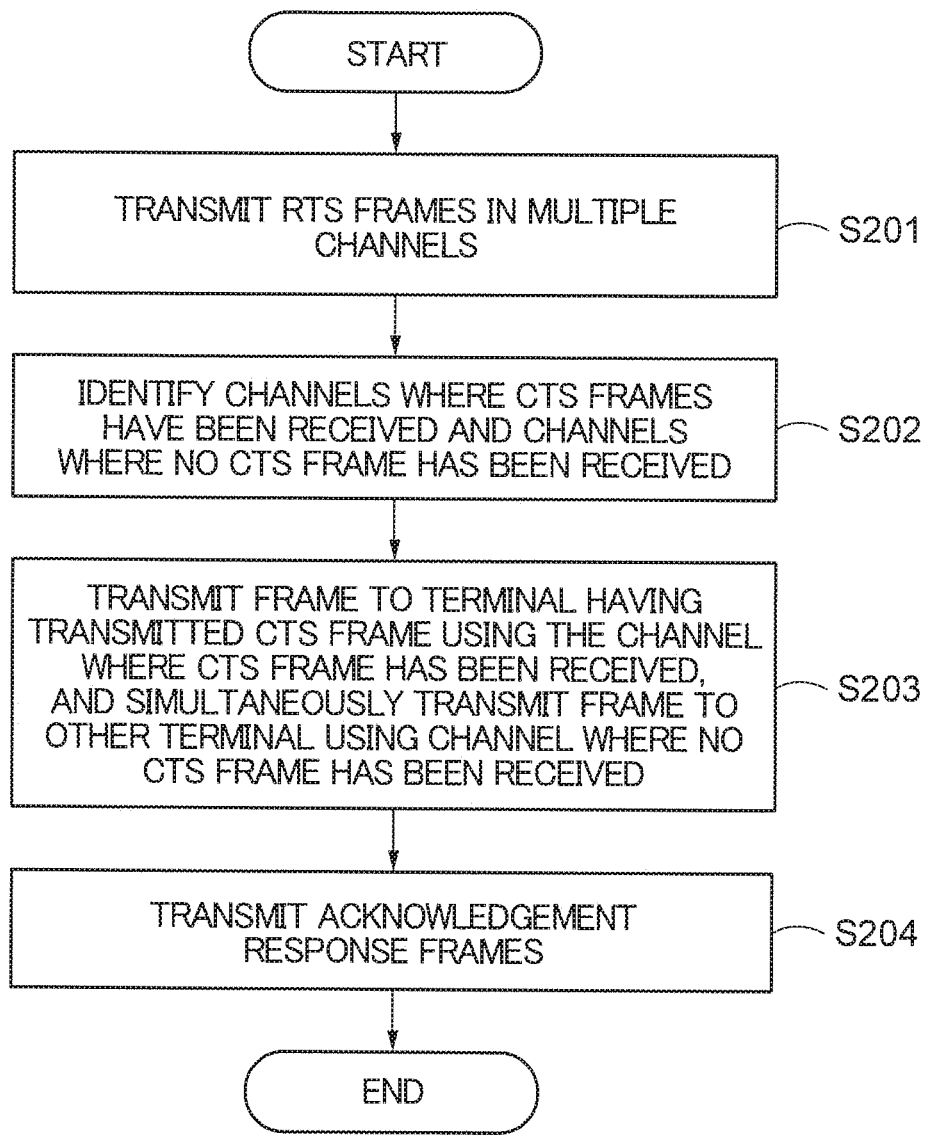
FIG. 10 is a diagram showing a flowchart of an example of an operation of the base station according to the first embodiment.

FIG. 10 is a flowchart of an example of an operation of the base station according to this embodiment.

The base station determines to start MU-MC communication, and transmits the RTS frames to one or more terminals in multiple channels (S201). SIFS-after transmission of the RTS frame, the channels where the CTS frames have been received and the channels where no CTS frame has been received are identified among the channels where the RTS frames have been received (S202). The base station transmits the frame to the terminal (herein called a main terminal) having transmitted the CTS frame using the channel where the CTS frame has been received, and simultaneously transmits the frames to the other terminals (herein called sub-terminals) using some or all the channels where no CTS frame has been received (S203). It can be believed that the sub-terminal keeps NAV in the channel where the frame is to be transmitted, by means of receiving the RTS frame described above. Even in the case where the NAV is kept, transmission of a frame from the base station and transmission of a frame representing a response thereto are allowed. The base station receives the acknowledgement response frames transmitted from the main terminal and the sub-terminal SIFS-time after transmission of the frame (S204).

As described above, this embodiment allows the NAV not to be cancelled (NAV to be kept) even in the case where the no CTS frame is received SIFS-time after receipt of the RTS frame. Thus, an unnecessary transmission operation to the base station having a possibility of being incapable of the reception operation is eliminated, thereby allowing the useless power consumption of the terminal to be reduced. The base station transmits data to the terminal having responded with the CTS frame in the responding channel, and transmits data also in the channel without any reply with the CTS frame, to the terminal standing by in the channel concerned (the terminal other than the terminal having not responded with the CTS frame). Thus, the band of the channel can be effectively utilized, thereby allowing the system efficiency to be improved.

This embodiment illustrates a mode of communication between the base station and the multiple terminals. Alternatively, the present invention can implement a case of MU-MC communication between terminals without intervention of the base station. For example, the case applies to a case where one of multiple terminals serves as a transmitter while at least two of the remaining terminals serve as receivers, and the terminals perform MU-MC communication. As standards of communication between terminals without intervention of a base station, WiFi Direct and the like have been known. When a terminal supporting WiFi Direct enables this function, the terminal is recognized as a base station by the other terminals, thereby allowing one-to-one or one-to-many connection.

Second Embodiment

Figure 11:
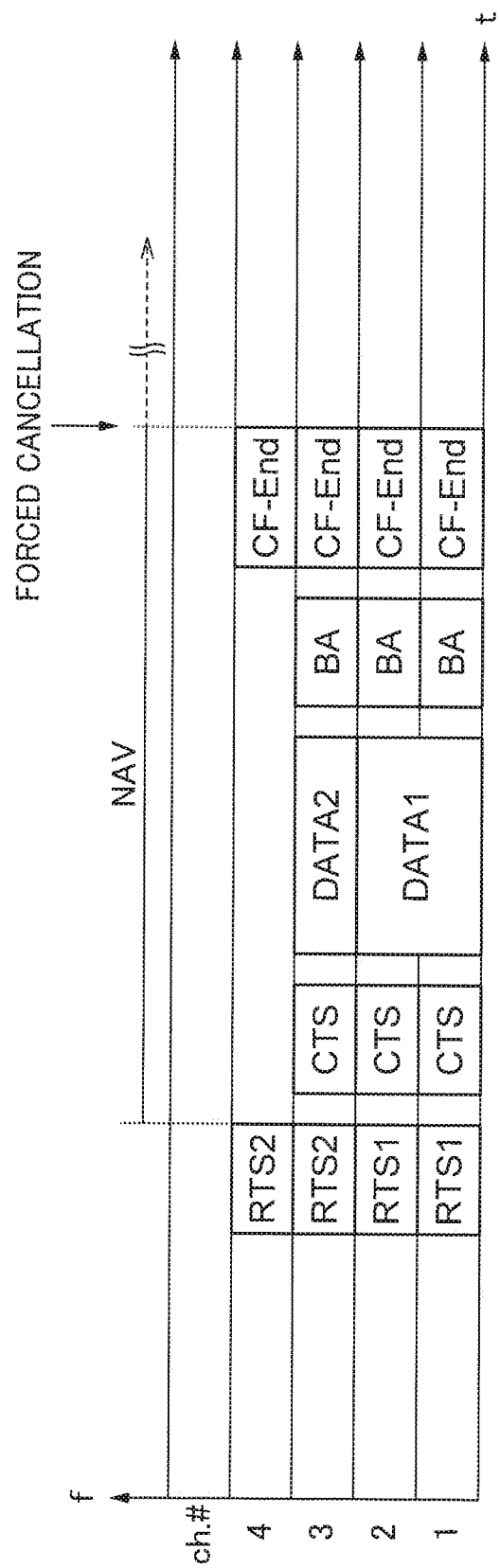
FIG. 11 is a diagram showing an example of an operation sequence according to a second embodiment.

FIG. 11 shows an example of an operation sequence pertaining to the MU-MC communication between the base station 11 and multiple terminals according to a second embodiment. Description is made mainly on difference from the sequence of FIG. 6 in the first embodiment.

Typically, as the medium reserved duration set in the "Duration/ID" field of the RTS frame, a time period from the end of the RTS frame to the end of the BA frame is set. The first embodiment also assumes this case. In this sequence example, a medium reserved duration longer than the assumed time period from the end of the RTS frame to the end of the BA frame is set in the "Duration/ID" field of the RTS frame. Provided that the assumed time period from the end of the RTS frame to the end of the BA frame is 1 ms, for example, it can be considered that 10 ms is set. The NAV pertaining to the time longer than the assumed time to the end of the BA frame is sometimes called LongNAV.

In this sequence, SIFS-time after reception of the BA frames in the channels 1 to 3 in MU-MC communication, the base station transmits a CF (Contention Free)-End frame. The CF-End frame is a frame for forcedly cancelling the NAV set by the terminal. In the RA field of the CF-End frame, a broadcast address is set, for example. The CF-End frames are transmitted not only in the channels 1 to 3 where the CTS frame (or having received the BA frame) has been received but also in the channel 4 where the CTS frame has not been received (or the BA frame has not been received). The terminals having received the CF-End frames in the channels 1 to 3 among terminals having the RTS frames which have received in the channels 1 to 3 and are not addressed for the own terminals cancel the NAV set in the channels 1 to 3 after detecting the CF-End frame. For example, in a case where the terminal 3 has received the RTS frames addressed for the terminal 1 or 2 in the channels 1 to 3, the NAV has been kept in the channels 1 to 3 since the end of the RTS frame. Consequently, the NAV is cancelled upon receipt of the CF-End frame. Also in a case where the terminal 1 is standing by not only in the channels 1 and 2 but also in the channel 3 and has been received the RTS frame addressed for the terminal 2 in the channel 3, the NAV is kept in the channel 3. Consequently, the NAV is cancelled upon receipt of the CF-End frame.

In the channel 4, even if the terminal (herein assumed as the terminal 3) having received the RTS frame addressed for the terminal 2 does not receive the CTS frame SIFS-time after the receipt of the RTS frame, the NAV is kept. In the channel 4 where the NAV is kept, the NAV is required to be cancelled in conformity with the cancellation of the NAVs in the other channels 1 to 3 after completion of MU-MC communication in the channels 1 to 3. Thus, as described above, the base station transmits the CF-End frames in the channels 1 to 3, and simultaneously transmits the CF-End frame also in the channel 4 where the CTS frame has not been received. The terminal 3 having received the CF-End frame in the channel 4 cancels the kept NAV. The terminal 3 can thus be prevented from continuing keeping the NAV in the channel 4 where the MU-MC communication has not been performed because the CTS frame has not been received.

According to an operation example of the base station of this embodiment, the controller 83 transmits the CF-End frame, in the channel where the CTS frame (or the BA frame) has been received, after completion of receiving the BA frame, and simultaneously transmits the CF-End frame also in the channel where the CTS frame has not been received. According to an operation example of the terminal, in a case where the NAV is kept in the channel where the CF-End frame has been received, the controller 33 cancels the NAV after completion of receiving the CF-End frame.

Figure 12:
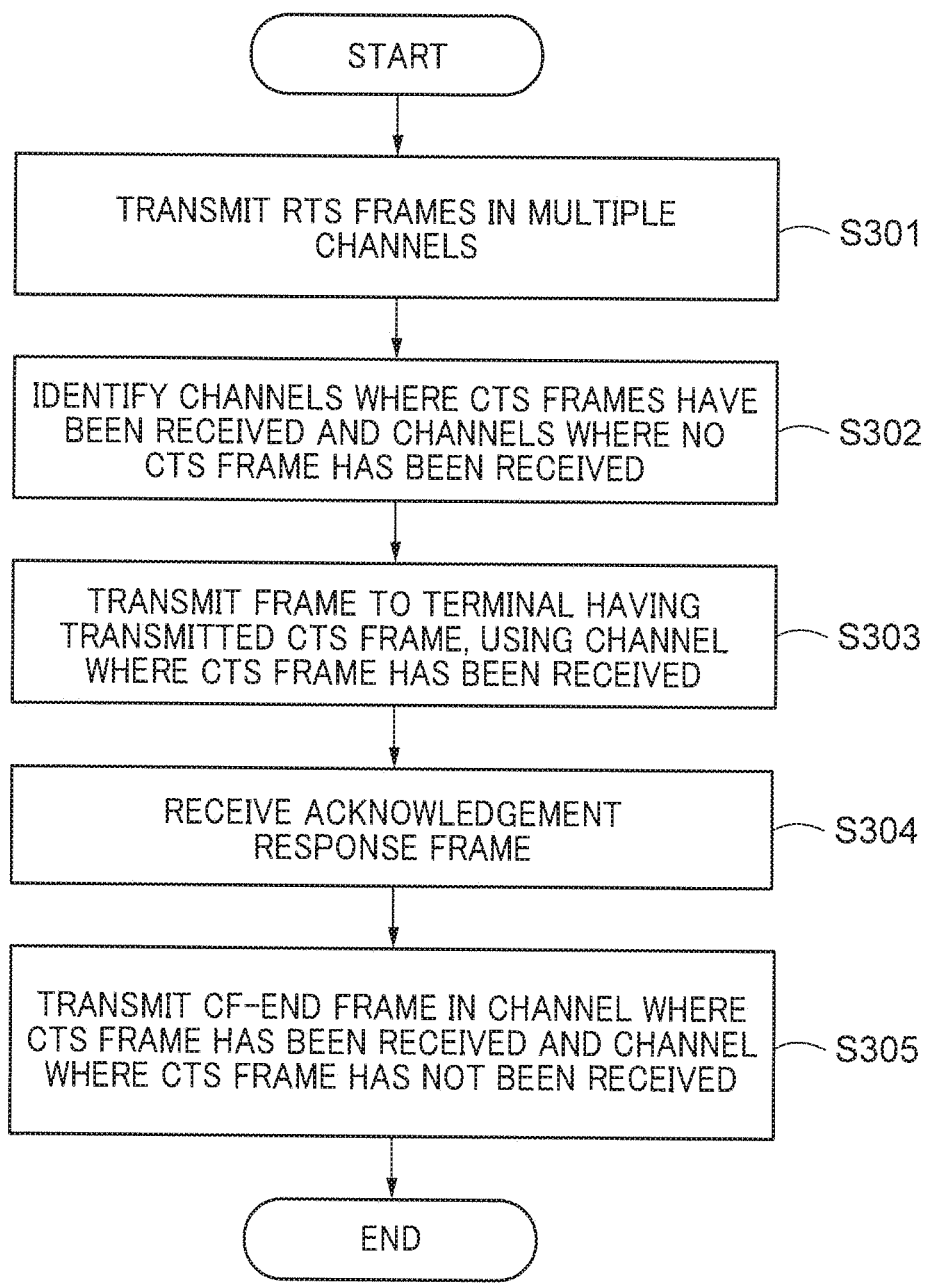
FIG. 12 is a diagram showing a flowchart of an example of an operation of a base station according to the second embodiment.

FIG. 12 is a flowchart of an example of an operation of the base station according to this embodiment.

The base station determines to start MU-MC communication, and transmits the RTS frames to one or more terminals in multiple channels (S301). SIFS-after transmission of the RTS frame, the channels where the CTS frames have been received and the channels where no CTS frame has been received are identified among the channels where the RTS frames have been received (S302). The base station transmits the frame to the terminal having transmitted the CTS frame using the channel where the CTS frame has been transmitted (S303). The base station receives the acknowledgement response frame transmitted from the terminal SIFS-time after transmission of the frame (S304). SIFS-after receipt of the acknowledgement response frame, the CF-End frames are transmitted in the channels where the CTS frames have been received and the channels where no CTS frame has been received (S305).

As described above, according to this embodiment, even in the channel where data transmission has not been performed in the MU-MC scheme owing to absence of the CTS frame response, the CF-End frame is transmitted, which can prevent the NAV from being continued in the channel concerned after completion of the data transmission.

Third Embodiment

In a third embodiment, through a beacon frame or a newly defined management frame, the period during which MU- MC communication is performed (MU-MC period) is notified. The MU-MC period may be defined in the unit of beacon interval between a beacon frame and a beacon frame to be transmitted next, or may be defined on the basis of any start time and any finish time. In this case, any start time described above may be the start time of the beacon interval, or any time in the beacon interval. The finish time may be the finish time of the beacon interval, or any time in the beacon interval. In this embodiment, as with the first and second embodiments, in the MU-MC period, the NAV is not cancelled (NAV is continued) in the channel where no CTS frame has been received SIFS-after receipt of the RTS frame addressed for another terminal. On the contrary, in the period other than the MU-MC period (non-MU-MC period), the NAV is cancelled in the channel where no CTS frame has been received SIFS-time after receipt of the RTS frame addressed for another terminal. In the non-MU-MC period, communication is performed in conformity with the standard, such as IEEE 802.11b/g/n/ac, on the basis of the primary channel. It is thus believed that even if the NAV is cancelled in the non-MU-MC period in a case without receipt of the CTS frame, the problem as described in the first embodiment (while the base station performs the MU-MC communication with the multiple terminals, another terminal performs uplink transmission to the base station) does not occur.

Figure 13:
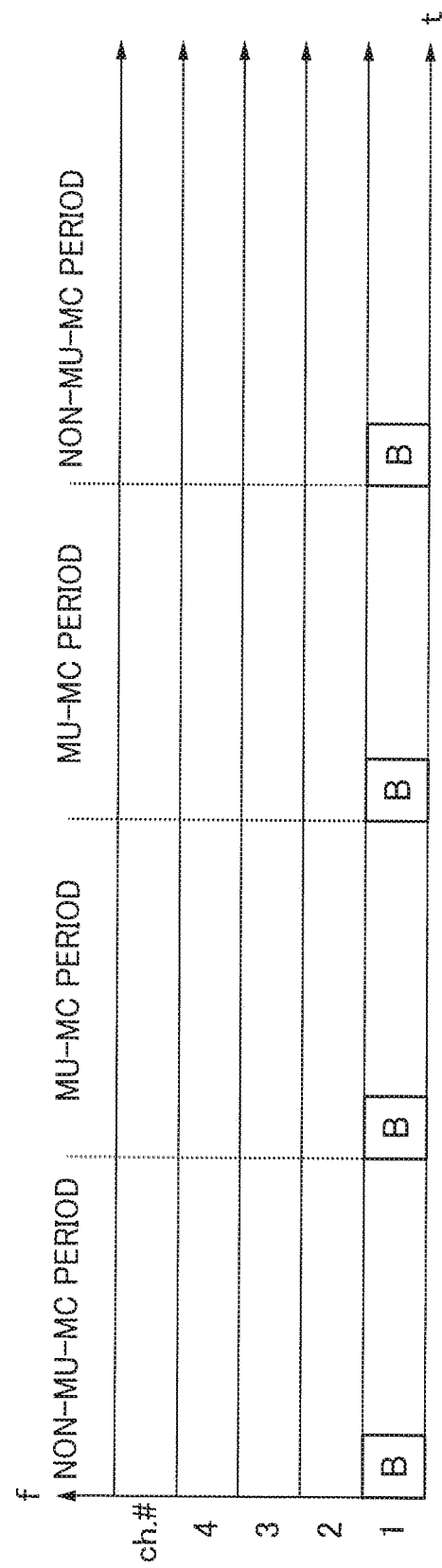
FIG. 13 is a diagram illustrating an overview of an operation according to a third embodiment.

FIG. 13 shows an overview of an operation pertaining to the MU-MC communication between the base station 11 and multiple terminals according to this embodiment. In the diagram, rectangles with characters "B" represent beacon frames. The base station transmits the beacon frames in the channel 1 (it is herein assumed that the channel 1 is the primary channel) at a constant frequency. In the beacon frame, information is set that indicates whether the beacon interval starting from this beacon frame is an MU-MC period. Such information may be set as an information element (FIG. 4(B)) in the body field of the beacon frame. Alternatively, this information may be set in an available region in an existing field or a newly added field. For example, a bit of 1 may indicate the MU-MC period, while a bit of 0 may indicate the non-MU-MC period.

The terminal having received the beacon frame determines that the beacon interval at this time is the MU-MC period in the case where the information indicating the MU-MC period is set. During the beacon interval, even if the RTS frame addressed for another terminal is received from the base station and the CTS frame is not received SIFS-time after the reception, the NAV in the channel where the RTS frame has been received is continued. On the contrary, in the case where the information indicating the non-MU-MC period is set, the beacon interval at this time is determined to be the non-MU-MC period. During the beacon interval, in a case where the RTS frame addressed for another terminal is received from the base station, the NAV in the channel where the CTS frame has not been received SIFS-time after the reception is cancelled. The terminal having received the beacon frame may start the standby operation in the channel for MU-MC communication in the case where the information indicating the MU-MC period is set in the beacon frame. In the case where the non-MU-MC period is indicated, this terminal performs the standby operation only in the primary channel. The standby operation channel may thus be switched according to whether the period is the MU-MC period.

According to an operation example of the base station according to this embodiment, the controller 83 determines to start the MU-MC communication and then determines the MU-MC period, and instructs the transmission processor 81 to generate a frame (a beacon frame, a newly defined management frame or the like) containing information for identifying the determined period in a predetermined field. The transmission processor 81 generates and transmits the frame according to an instruction by the controller 83.

According to an operation example according to this embodiment, the frame type determiner 42 of the reception processor 32 analyzes the predetermined field of the frame received from the base station, and determines whether information identifying the period of the MU-MC communication is set. In a case where this information is set, the controller 33 identifies the MU-MC period concerned, and manages the identified MU-MC period. The MU-MC period is identified on the basis of the position of the beacon interval, the pair of the start time and the finish time, or a combination thereof. The controller 33 may include an MU-MC period manager that manages the MU-MC period. In a case where the controller 83 receives the RTS frame addressed for another terminal but does not receives the CTS frame SIFS-time after the reception, this controller determines whether the current time is within the MU-MC period. In the case within the MU-MC period, this controller performs control to keep the NAV which has been set since receipt of the RTS frame. In the case of the non-MU-MC period, this controller cancels the NAV which has been set since receipt of the RTS frame.

Figure 14:
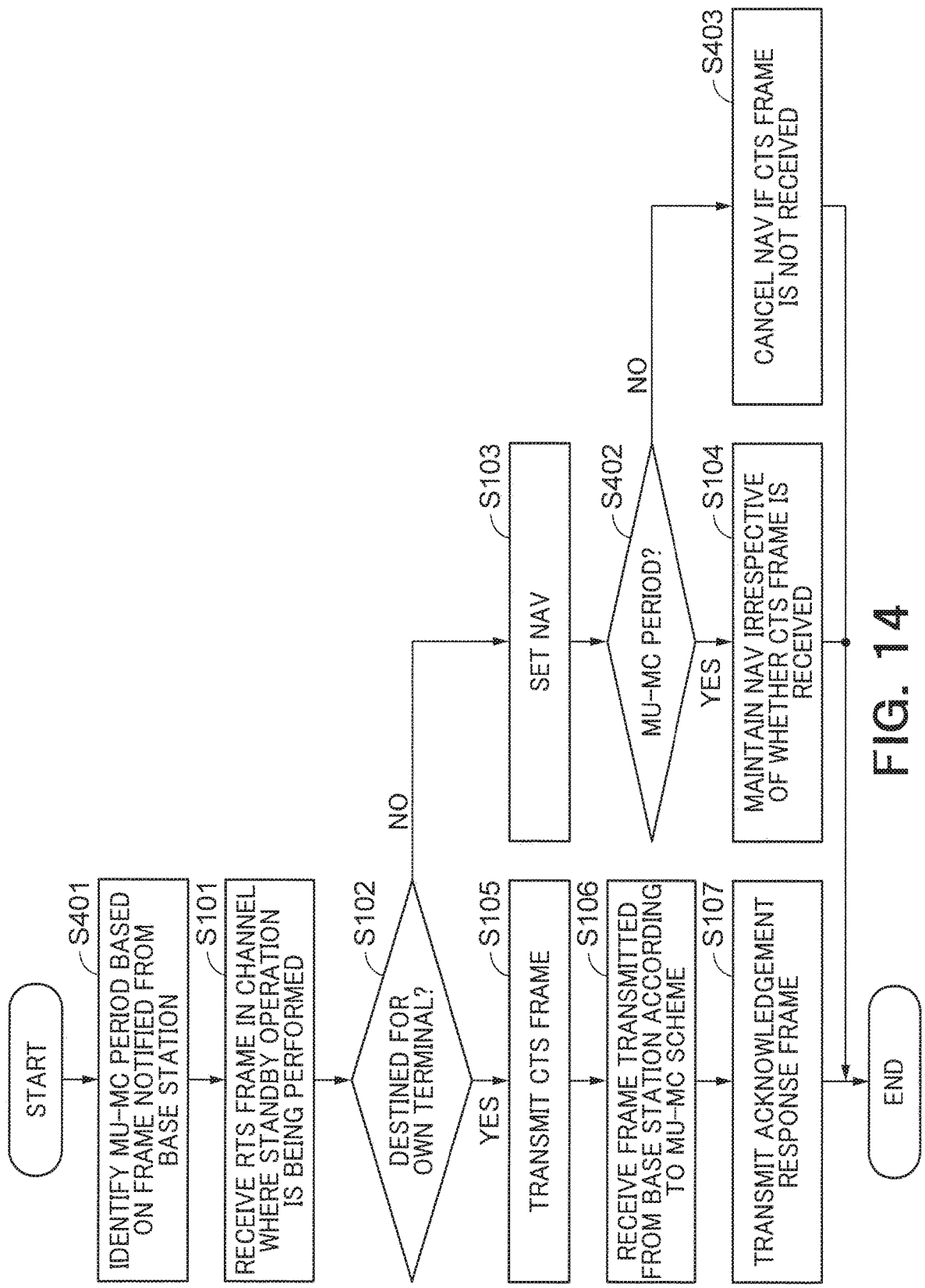
FIG. 14 is a diagram showing a flowchart of an operation of a terminal according to the third embodiment.

FIG. 14 shows a flowchart of an example of an operation of the terminal according to the third embodiment. Steps identical or corresponding to those in FIG. 9 are assigned the same symbols. The redundant description is omitted.

The terminal receives a frame, such as a beacon frame, transmitted from the base station, and identifies the MU-MC period on the basis of the received frame (S401). When the terminal receives the RTS frame addressed for another terminal in the case of the MU-MC period (YES in S402), the terminal keeps the NAV irrespective of whether the CTS frame has been received, as with the first embodiment (S104). On the contrary, when the terminal receives the RTS frame in the non-MU-MC period (NO in S402), the terminal cancels the NAV in a case where the CTS frame is not received SIFS-time after the reception (S403). In a case where the terminal receives the CTS frame SIFS-time after the receipt, the terminal keeps the NAV.

Fourth Embodiment

In this embodiment, after transmission of the RTS frame, the base station communicates with multiple terminals in some of the multiple channels where the CTS frames have been successfully received, using downlink spatial multiplexing communication; in further detail, the base station communicates using downlink MU-MIMO (Multi-User Multiple Input, Multiple Output) scheme. As with the first to third embodiments, in the remaining channels, downlink communication without use of MU-MIMO is performed. This embodiment pertains a method of determining the medium reserved duration to be set in the "Duration/ID" field of the RTS frame, in such a case. It is hereinafter assumed that MU-MIMO indicates downlink MU-MIMO. However, this embodiment is applicable to uplink MU-MIMO (data transmission from multiple terminals to the base station in a spatial multiplexing manner).

In the MU-MIMO communication, the base station transmits frames such as data frames (aggregation frames are hereinafter assumed) to multiple terminals in a spatial multiplexing manner which include the terminal having returned the CTS frame. The spatial multiplexing represents simultaneous transmission at the same frequency. The downlink MU-MIMO scheme is defined in IEEE 802.11.ac.

When the base station receives BA frames which are responses to the aggregation frames having been transmitted to multiple terminals in the MU-MIMO scheme, the base station sequentially receives the BA frames from the terminals. On the other hand, in communication in a channel without use of the MU-MIMO scheme, the BA frame is received one time after transmission of the aggregation frame, as with the above embodiments. Consequently, in the case of the MU-MIMO scheme, the time until completion of receiving the BA frame is longer than that in the case without use of the MU-MIMO scheme by an extent due to sequential BA frame reception from the multiple terminals after transmission of the aggregation frames.

There is thus a possibility that the terminal without use of the MU-MIMO scheme having transmitted the BA frame of the own terminal transmits a frame continuously in the same channel (channel where the BA frame transmission has been completed) in a time period from completion of the BA frame transmission by the own terminal to BA frame transmission by all the terminals using the MU-MIMO scheme. In this case, a problem similar to that of the first embodiment (problem of transmission of an uplink signal to the base station during downlink communication by the base station) can occur. Similar problems can occur in terminals that do not participate in the MU-MC communication.

Thus, in this embodiment, the medium reserved duration to be set in the "Duration/ID" field of the RTS frame to be transmitted in the channel without use of the MU-MIMO scheme has the same value as the medium reserved duration to be set in the "Duration/ID" field of the RTS frame to be transmitted in the channel using the MU-MIMO scheme. The medium reserved duration of the channel using the MU-MIMO scheme is a time period assumed from the end of the RTS frame to the end of the BA frame transmitted by the last terminal transmitting the BA frame among the terminals performing the MU-MIMO communication. Application of this time period also to the medium reserved duration where the MU-MIMO scheme is not used allows the NAV in the channel concerned to be kept until the completion of transmitting all the BA frames in the MU-MIMO communication. The above problem can thus be prevented. This embodiment is hereinafter described in detail.

Figure 15:
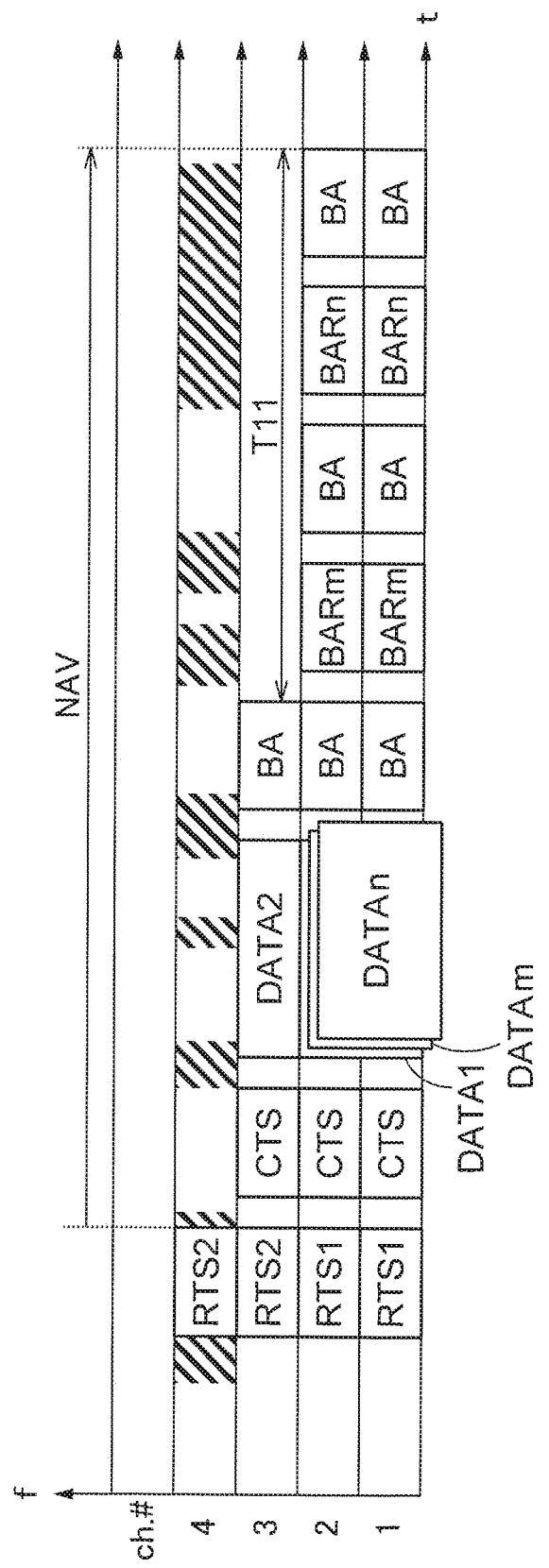
FIG. 15 is a diagram showing an example of an operation sequence according to a fourth embodiment.

FIG. 15 shows an example of an operation sequence pertaining to the MU-MC communication between the base station 11 and multiple terminals according to the fourth embodiment. Description is made mainly on difference from the sequence of FIG. 6 in the first embodiment.

Upon receipt of the CTS frames from the terminal 1 in the channels 1 and 2, the base station transmits the aggregation frames (in further detail, physical packets including the aggregation frames) according to the MU-MIMO scheme to the multiple terminals including the terminal 1 (three terminals are herein assumed, and terminals other than the terminal 1 are called terminals m and n) in the band into which the channels 1 and 2 are bound together. That is, the base station transmits the multiple aggregation frames to the terminals 1, m and n in a spatial multiplexing manner. The base station uses, for example, a technique called beamforming for MU-MIMO scheme communication. The base station forms, for the terminals, beams where the interference is the minimum between data streams addressed for the terminals 1, m and n, that is, beams where the data streams addressed for the terminals are spatially orthogonal to each other. The formation allows spatial multiplexing to be achieved. The base station can simultaneously transmit separate data items to the terminals 1, m and n. For the sake of beamforming, the base station preliminarily estimates channels to the terminals by means of receiving frames including known bit streams, and forms the beams using information on the estimated channel.

It is assumed that the terminals that can be selected as objects of MU-MIMO communication (here the terminals m and n) are performing the standby operations in at least the channels 1 and 2. The base station sets the group ID of a group to which the terminals 1, m and n commonly belong, in the headers of physical packets containing aggregation frames to be transmitted to the terminals. The terminals having received the aggregation frames determines whether the terminals themselves belong to the group indicated by the group ID set in the header of the physical packet. In a case where the own terminal belongs to the group, the aggregation frame addressed for the own terminal is detected by demodulating the remaining latter part of the packet. In a case where the own terminal does not belong to the group indicated by the group ID, demodulation of the remaining latter part of the packet is not required. Thus, unnecessary operations are omitted, which can facilitate reduction in power consumption. Instead of use of the group ID, a configuration may be adopted that always demodulate the MAC frame, and determines presence or absence of the MAC frame addressed for the own terminal. Alternatively, instead of the group ID, pieces of identification information on the individual terminals for which the aggregation frames are addressed may be set in the headers of the physical packets. The identification information may be an AID, a part of the AID, a MAC address, or other information.

FIG. 16 shows an example of a format of a physical packet to be used in the MU-MIMO communication. This format example is only one example. Any format other than this example may be used instead. There are fields (L-STF, L-LTF, L-SIG, VHT-SIG-A, VHT-STF and VHT-SIG-B) corresponding to physical headers, and fields for setting the MAC frames. L-STF, L-LTF and L-SIG are fields that can be recognized by terminals in conformity with a legacy standard, such as IEEE 802.11a, for example. Information on signal detection, frequency correction, transmission rate and the like is stored in the fields. The group ID is set in VHT-SIG-A, for example. Alternatively, a field for setting the group ID may be newly defined, and the group ID may be set in this field. The group ID may be set in another field, such as the frame body field of the MAC frame, instead. Instead of the group ID, identification information on the individual terminal may be set. In VHT-SIG-A, information on any of the number of streams and a coding (error correcting code, such as BCC or LDPC) scheme and both of them which are used by the multiple terminals communicating in a spatial multiplexing manner may be set. In VHT-SIG-B, MCS (Modulation and Coding Scheme) or the like may be set.

The terminal 1, that is, the terminal having returning the CTS frame in response to the RTS frame transmitted from the base station, among the terminals having received the aggregation frames transmitted from the base station in MU-MIMO, returns the BA frames in the channels 1 and 2 SIFS-time after receipt of the aggregation frame. The BA frame is a duplicate frame. It may be configured so that one BA frame can be returned in a band into which the channels 1 and 2 are combined. In a case where the MIMO transmission is individually performed in each of the channels 1 and 2, BA frames having different content may be returned in the respective channels 1 and 2.

The base station receives the BA frame from the terminal 1, and subsequently selects the terminal (the second terminal) for returning the BA frame and transmits a BA request frame, which is a control frame, to the selected terminal in the channels 1 and 2. The BA request frame is a frame for requesting transmission of the BA frame. For example, a frame defined according to IEEE 802.11 may be used. The BA request frames transmitted in the channels 1 and 2 may be duplicate frames. The order of selecting the terminals may be determined according to any of methods, such as of a random order, the order of identification numbers (AIDs or MAC addresses) or a combination thereof. The example of the diagram shows a case where the terminal m is selected. The terminal m having received the BA request frames in the channel 1 and 2 transmits the BA frames in the channels 1 and 2 SIFS-time after the reception. The BA frame is a duplicate frame. In a case where the MIMO transmission is individually performed in each of the channels 1 and 2, different BA request frames may be transmitted in the channels 1 and 2, and different BA frames may be returned from the terminals.

Next, the base station selects the third terminal (here the terminal n), and transmits the BA request frames to the terminal n in the channels 1 and 2 SIFS-time after receipt of the BA frame received from the second terminal m. The terminal having received the BA request frames in the channel 1 and 2 transmits the BA frames in the channels 1 and 2 SIFS-time after the reception. The BA frame is a duplicate frame. In a case where the MIMO transmission is individually performed in each of the channels 1 and 2, different BA request frames are transmitted in the channels 1 and 2, and different BA frames are returned from the terminals.

Meanwhile, in the channel 3, the base station transmits the aggregation frame to the terminal 2 SIFS-time after receipt of the CTS frame from the terminal 2. The terminal 2 returns the BA frame SIFS-time after receipt of the aggregation frame. The terminal 2 validly keeps also thereafter the NAV set on the basis of the RTS frame. In further detail, during the time period from the receipt of the RTS frame to the end of the BA frame transmitted by the aforementioned third terminal (time T11 in FIG. 15), the NAV is kept. During the time T11, the terminal 2 is prevented from spontaneously transmitting the frame. The NAV of the terminal 2 is cancelled at the timing of the end of the BA frame transmitted by the third terminal. Likewise, any terminal that is other than the terminal 2 and has received the RTS frame in the channel 3 keeps the NAV during the time T11.

In the channel 4, the base station does not receive the CTS frame from the terminal 2. Consequently, the base station transmits no frame in the channel 4. The terminal having received the RTS frame transmitted from the base station in the channel 4 keeps the NAV during the medium reserved duration (T11 in FIG. 15) set in the "Duration/ID" field of the RTS frame. As with any of the first to third embodiments, the NAV is kept even if no CTS frame is received SIFS-time after receipt of the RTS frame. The hatched rectangles in the diagram indicate interference signals for the terminal 2 in this sequence example. The interference signals are signals to be transmitted from the terminal or the base station which belong to BSS2, both of these parties, a legacy station belonging to the base station 11, or a combination thereof, for example.

According to an operation example according to this embodiment, the controller 83 of the base station selects multiple channels to be used for MU-MC communication and multiple terminals, and transmits the RTS frames to the selected terminals in the selected channels. In this case, an assumed time period to receipt of the BA frames from all the terminals in the MU-MIMO communication is calculated according to the number of terminals performing the MU-MIMO communication, and a time period that is the calculated time or more is set as the medium reserved duration in the "Duration/ID" field of the RTS frame. The controller 83 includes a medium reserved duration determiner that determines the medium reserved duration as described above. The length (time length) of RTS frame, CTS frame, aggregation frame (or data frame), BA frame, and BAR frame, and the frame intervals (SIFS etc.) have been preliminarily known. Consequently, the assumed time to receipt of the "BA" frames from all the terminals can be preliminarily estimated.

Upon receipt of the CTS frames in some or all the channels where the RTS frames have been transmitted, the controller 83 selects the terminal (herein called a main terminal) for downlink MU-MIMO communication from among the terminals having transmitted the CTS frames, and selects one or more channels where the MU-MIMO communication is performed. The channels are selected in units of channels, or units of bands each containing multiple channels combined thereinto, or on the basis of both types of the units. In the sequence example of FIG. 15 described above, the band into which the channels 1 and 2 are combined is selected. Alternatively, MU-MIMO communication can be performed separately in the individual channels 1 and 2.

The controller 83 selects the terminal (herein called a sub-terminal) for the MU-MIMO communication from among other terminals for which the RTS frame is not addressed among terminals belonging to the base station and capable of MU-MIMO communication. Provided that the number of multiplexes capable of MU-MIMO communication is N, N−1 terminals at the maximum can be selected. In consideration of a case where one terminal can receive multiple data streams, the terminals may be selected so as to maintain the total number of data streams across the terminals to be N or less.

When another terminal for MU-MIMO communication is selected, a spatial multiplexing table that associates the group ID and the identification information on the terminals belonging to the group indicated by the ID may be used, for example. The spatial multiplexing table is stored in the storage 85. In this case, the controller 83 identifies the group to which the main terminal belongs, and the sub-terminal is selected in the group. Such a group is preliminarily generated at the time of association or any time thereafter or at both the times, and the group ID is notified to the terminals. The method of generating the group may be any method. According to an example, it can be considered that terminals with low correlation (e.g., terminals far from each other in distance) are configured to belong to the same group.

As to selection of the sub-terminal, terminals are selected so that the total number of main terminal and sub-terminals (in further detail, the number of data streams) can be the number N of multiplexes or less. The terminals may be selected with a preference in a descending order of the amount of data, or selected according to another criterion. In a case without data to be transmitted to the terminal, the terminal is not required to be selected.

The terminals belonging to the base station can execute downlink MU-MIMO communication, and may preliminarily notify that the function of MU-MIMO communication is enabled (on), to the base station at the time of association or any timing thereafter. The base station may recognize the terminal having issued the notification, as a terminal capable of downlink MU-MIMO communication.

When the controller 83 of the base station determines multiple terminals for MU-MIMO communication, this controller transmits frames (one or more data frames or aggregation frames) to the multiple terminals through the transmission processor 81 using the channels selected for the MU-MIMO communication according to the MU-MIMO scheme. At the same time, in the channels that do not perform the MU-MIMO communication, frames (one or more data frames or aggregation frames) are transmitted through the transmission processor 81 to the terminals having transmitted the CTS frames in the channels concerned. For example, the length (time length) of the frame to be transmitted according to the MU-MIMO scheme is the same as the length (time length) of the frame to be transmitted without use of the MU-MIMO scheme.

The reception processor 82 receives the BA frame from the terminal (the first terminal) having returned the CTS frame in response to the RTS frame transmitted from the base station among the terminals having communicated according to the MU-MIMO scheme. The BA frame is received SIFS-time after frame transmission according to the MU-MIMO scheme. The first terminal has returned the CTS frame. Consequently, this terminal preliminarily grasps that the BA frame is to be returned SIFS-time after receipt of the frame according to the MU-MIMO scheme. A configuration may be adopted where when the base station transmits, to the terminal, a single frame instead of the aggregation frame, the base station receives the ACK frame instead of the BA frame from the terminal. When the controller 83 detects, at the reception processor 82, the BA frame from the first terminal, this controller transmits the BA request frame to the second terminal SIFS-time after the reception and then receives the BA frame from the second terminal SIFS-time thereafter. By the time of completion of receiving the BA frames from all the terminals having communicated according to the MU-MIMO scheme, the selection of the terminals, transmission of the BA request frame to the terminal concerned, and receipt of the BA frame from the terminal concerned are repeated.

From the terminal having communicated without use of the MU-MIMO scheme, the reception processor 82 receives the BA frame in the channel (channel 3 in the example of FIG. 15) having transmitted the frame, SIFS-time after the frame transmission. This terminal keeps the NAV after transmission of the BA frame until the lapse of the medium reserved duration designated in the RTS frame (in the T11 until completion of receiving all the BA frames in the MU-MIMO communication). Although transmission is prevented, the base station can use the channel concerned. For example, the controller 83 may perform carrier sensing using a carrier detector included in the receiver 72 or the reception processor 82 during a total time of the DIFS time and a randomly determined time. When the carrier sensing result is idle, frame transmission may be performed in the channel. The frame may be addressed for the same terminal having communicated in the channel concerned immediately therebefore (terminal 2 in the example of FIG. 15), or for another terminal. The DIFS time is only an example. Alternatively, this time may be any other frame interval time, such as AIFS time, only if the time is predetermined time period. Also in the following description, the DIFS time does not mean any limitation thereto. Any other predetermined time period can be used.

According to an operation example in this embodiment, upon receipt of the RTS frames from the base station in the multiple channels, the controller 33 of the terminal keeps the NAV during the medium reserved duration set in the "Duration/ID" fields from the end of the RTS frames in each of the channels where the RTS frames have been received.

The controller 33 transmits the CTS frame through the transmission processor 31 in the channel where the RTS frame addressed for the own terminal has been successfully received and the result of carrier sensing during the PIFS before the reception is idle. Upon receipt of the frame (one or more data frames, an aggregation frame or the like) from the base station SIFS-time after transmission of the CTS frame, the BA frame is returned through the transmission processor 31 SIFS-time after the reception. That is, the transmitter is instructed to transmit the BA frame, and the transmission processor 31 transmits the BA frame through the transmitter 23. As to the frame received from the base station, there are a case of receiving the frame transmitted according to the MU-MIMO scheme, and a case of receiving the frame without use of the MU-MIMO scheme. The case through which the reception has been made may be determined on the basis of the physical header. A configuration may be adopted where when the base station transmits a single frame to the terminal, this terminal transmits an ACK frame instead of the BA frame.

When the controller 33 then receives, in the channel where the RTS frame addressed for another terminal has been received from the base station, the frame transmitted according to the MU-MIMO scheme, this controller stands by reception of the BA request frame from the base station in the channel where the frame has been received. When the BA request frame is received by the reception processor 32, the controller 33 transmits the BA frame through the transmission processor 31 SIFS-time after the reception. The NAV is kept after the transmission until the medium reserved duration set in the "Duration/ID" field elapses.

Figure 17:
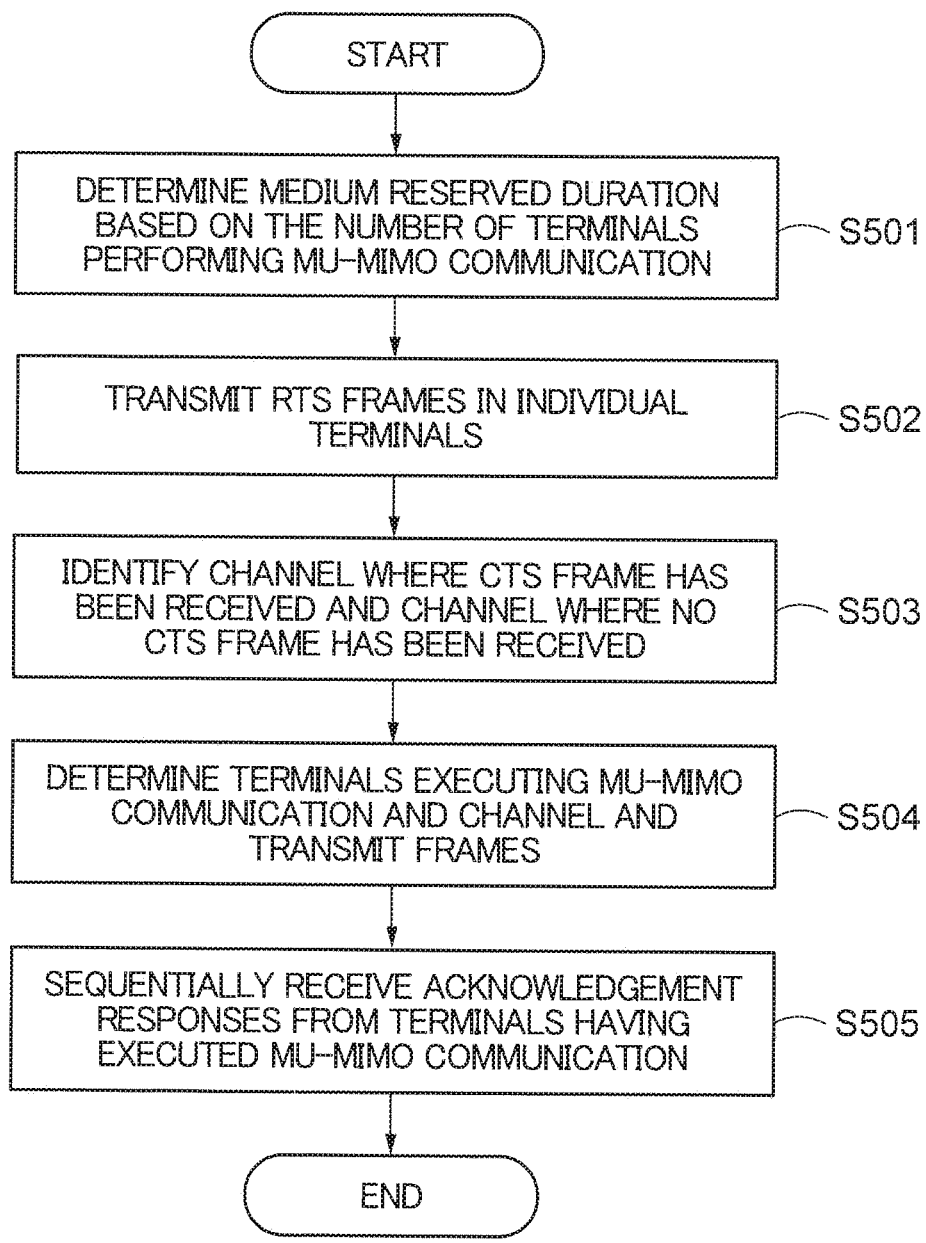
FIG. 17 is a flowchart of an example of an operation of a base station according to the fourth embodiment.

FIG. 17 is a flowchart of an example of an operation of the base station according to the fourth embodiment.

The base station determines to start the MU-MC communication, and determines the value of the medium reserved duration to be set in the RTS frame (S501). For determination of the value of the medium reserved duration, the number of terminals that perform the MU-MIMO scheme is considered. For example, the time required until completion of receiving the acknowledgement response frames, such as the BA frames, from all the terminals that perform the MU-MIMO scheme is considered. The base station transmits, in the multiple channels, the RTS frames having the "Duration/ID" fields in which the medium reserved durations are set (S502). SIFS-after transmission of the RTS frame, the channels where the CTS frames have been received and the channels where no CTS frame has been received are identified among the channels where the RTS frames have been transmitted (S503). The base station identifies the terminal (herein called the main terminal) that performs the MU-MIMO communication among the terminals having transmitted the CTS frames, and selects the terminals (herein called sub-terminals) that perform the MU-MIMO communication from among the other terminals connected to the base station (S504). The base station transmits the frames to the main terminal and the sub-terminals according to the MU-MIMO scheme using the channel where the main terminal has transmitted the CTS frame (the same S504). After transmission of the frames according to the MU-MIMO scheme, the base station receives the frame (here, the BA frame) representing the acknowledgement response from the main terminal, and subsequently repeats transmission of the BA request frame and reception of the BA frame as many time as the number of sub-terminals (S505).

A variation example of this embodiment may be implemented where the order of sub-terminals' returning the BA frames is preliminarily determined, and the BA frames are sequentially received from the sub-terminals without transmission of the BA request frame. For example, the base station sets information indicating the order of the sub-terminals, in the frames to be transmitted according to the MU-MIMO scheme. The sub-terminal grasps the turn of the own terminal in the order, stands by from completion of receiving the frame for a time period according to the grasped turn, and transmits the BA frame. The information indicating the order of the sub-terminals may be the header of a physical packet, the header or body field of a MAC frame, or another field.

As described above, according to this embodiment, the terminal having communicated in the channel without use of the MU-MIMO scheme can keep the NAV even after completion of the communication until completion of receiving all the acknowledgement response frames from the multiple terminals having received the frames according to the MU-MIMO scheme. Consequently, after completion of communication in the channel concerned, the terminal can be prevented from performing uplink transmission to the base station. This can reduce the useless transmission operation by the terminal, and prevent the power consumption from increasing.

Fifth Embodiment

In the first to fourth embodiments, an example in which the channels 1 to 4 being consecutive are employed are described. Below, the consecutiveness will be further described.

The channel numbers in the IEEE802.11 standard are provided at 5 MHz intervals, therefore, in the case of a channel width of 20 MHz, an interval between channel numbers at which channels do not overlap is 4. In the present embodiment, consecutive channels in a channel set mean consecutive channels that do not overlap. The channel numbers in the embodiment are for convenience, and ch.1 should be interpreted as channel number 36 in the 5 GHz band in the IEEE802.11 standard and ch.2 should be interpreted as channel number 40 in the 5 GHz band in the IEEE802.11 standard.

[5 GHz Band]

In the 5 GHz band of IEEE802.11 standard, since channel numbers are basically used at 20 MHz intervals, there is no problem in using the channels based on the actually used channel numbers.

[2.4 GHz Band]

Figure 18:
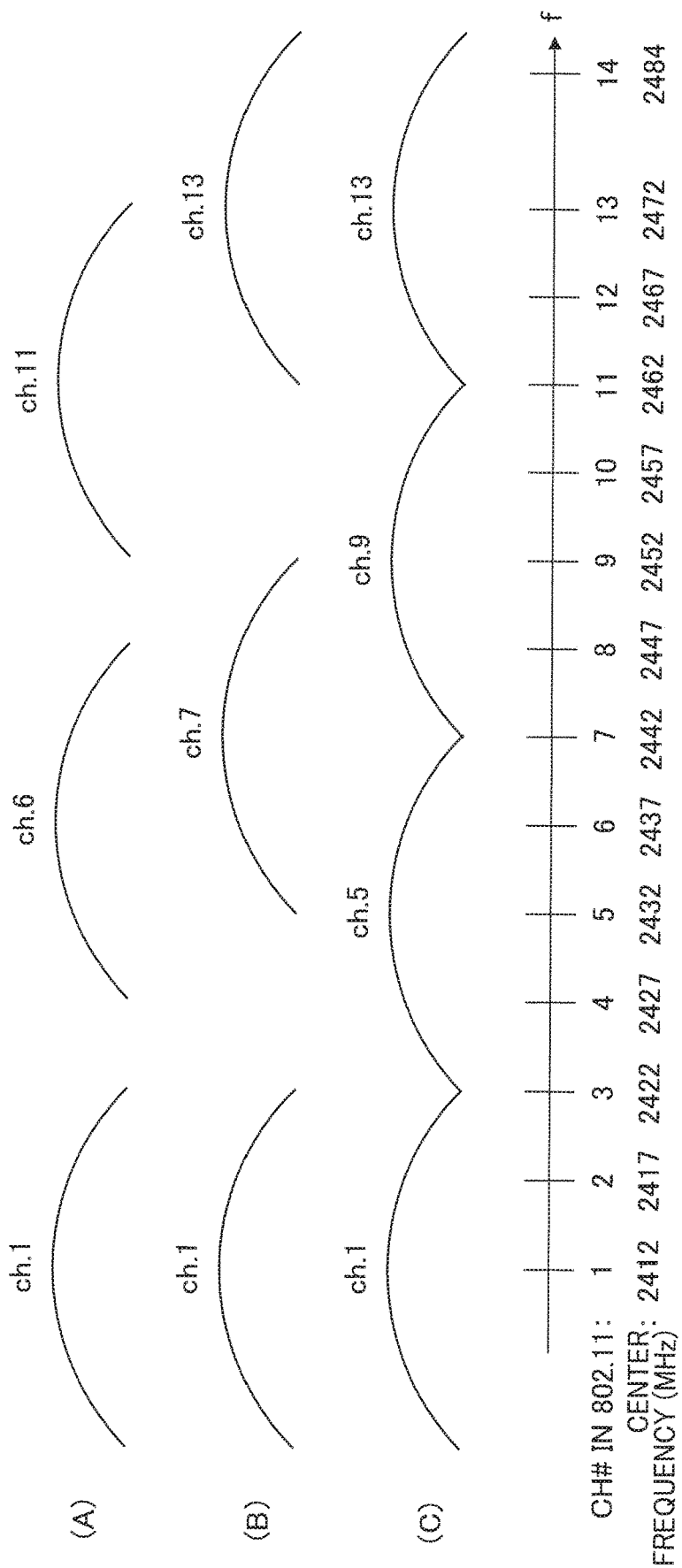
FIG. 18 is a diagram illustrating a channel arrangement.

On the other hand, in the 2.4 GHz band, as illustrated in FIG. 18, reference channel selection is performed at 25 MHz intervals (FIG. 18(A)) in such as North America and China, and at 30 MHz intervals (FIG. 18(B)) in Europe. Therefore, it may be performed at 25 MHz intervals (FIG. 18(A)) mirroring the selection for North America and China where, for example, ch.1 in the embodiment may be set to channel number 1 in the 2.4 GHz band in IEEE802.11 standard and ch.2 may be set to channel number 6 in the 2.4 GHz band in IEEE802.11 standard. Alternatively, it may be performed at 30 MHz intervals (FIG. 18(B)) mirroring the selection for Europe where, for example, ch.1 in the embodiment is set to channel number 1 in the 2.4 GHz band in the IEEE802.11 standard and ch.2 is set to channel number 7 in the 2.4 GHz band in the IEEE802.11 standard. Alternatively, as illustrated in FIG. 18(C), mirroring the 20 MHz channel intervals in the 5 GHz band, ch.1 in the embodiment may be set to channel number 1 in the 2.4 GHz band in IEEE802.11 standard and ch.2 may be set to channel number 5 in the 2.4 GHz band in IEEE802.11 standard. FIG. 18(C) exemplifies a future possible channel selection other than the ones in FIG. 18(A) and FIG. 18(B). However, in the case of such as North America, China and Europe, when another wireless communication system selects, as at least part of the channels, channel number 6 or 7 in the 2.4 GHz band, the frequency band partially overlaps with that of channel number 5. In this case, a frequency band in which mutual wireless communication systems influence each other broadens, and channel utilization efficiency decreases.

Sixth Embodiment

Figure 19:
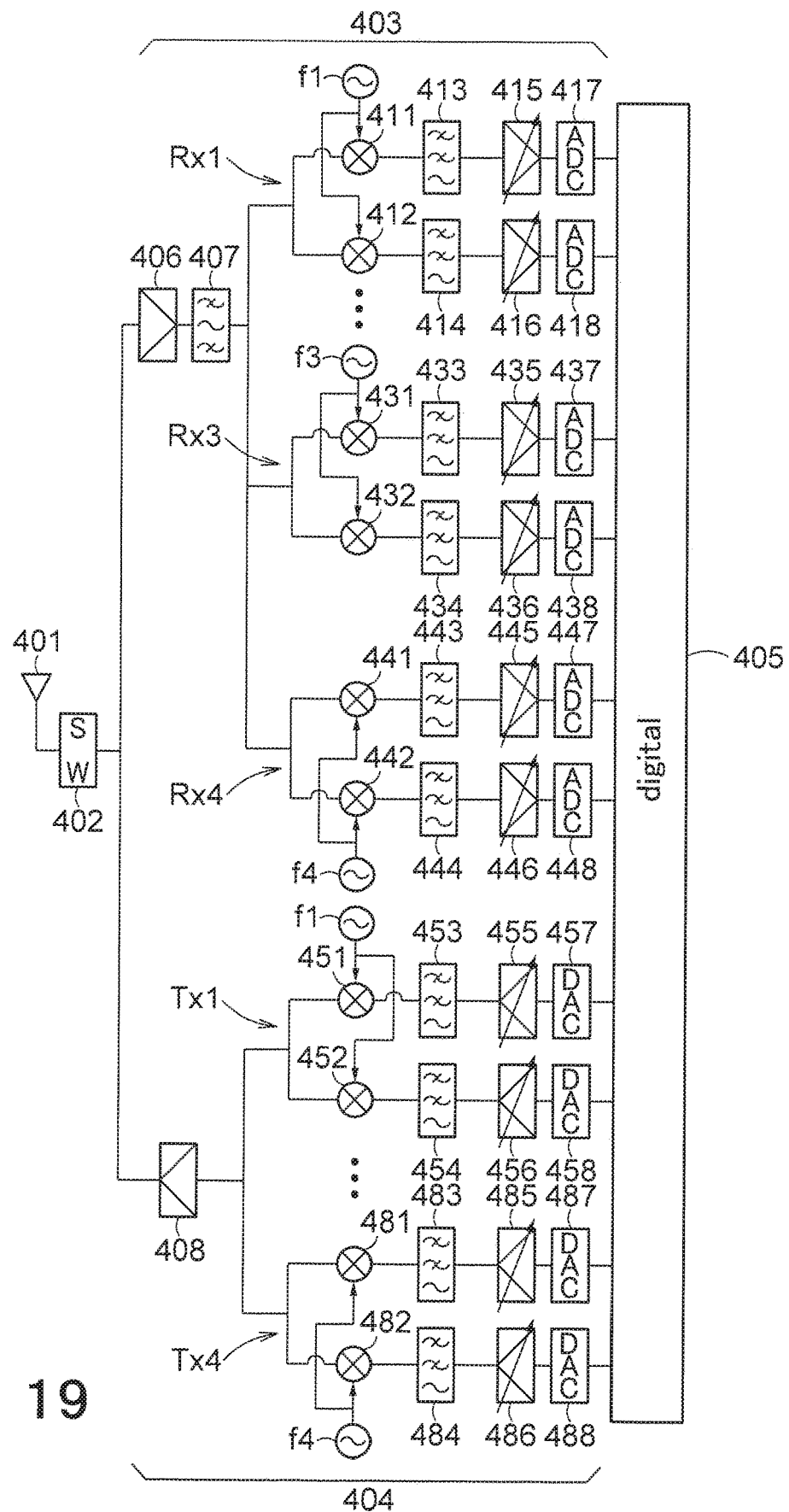
FIG. 19 is a diagram showing a hardware configuration example of the wireless communication device.

FIG. 19 shows an example of a hardware configuration of a wireless communication device according to this embodiment. This configuration can be used as the hardware configurations of the wireless communication device mounted on the terminal as shown in FIG. 7 and the wireless communication device mounted on the base station as shown in FIG. 8. The configuration of FIG. 19 shows an example of specific implementation of hardware configurations of analog processing parts of the PHY processing and wireless unit 20 in FIG. 7, and the PHY processing and wireless unit 70 in FIG. 8.

The wireless communication device in FIG. 19 includes an antenna 401, a switch 402, a reception system module 403, a transmission system module 404, and a digital processor 405. The digital processor 405 corresponds to the MAC processor 30 in FIG. 7 and the MAC processor 80 in FIG. 8, and elements for performing digital processes in the receivers 22 and 72 and the transmitters 23 and 73 in FIGS. 7 and 8. The reception system module 403 corresponds to elements for performing analog processes in the receivers 22 and 72 in FIGS. 7 and 8. The transmission system module 404 corresponds to elements for performing analog processes in the transmitter 23 and 73 in FIGS. 7 and 8.

The switch 402 connects the antenna 401 to any one of the reception system module 403 and the transmission system module 404. The switch 402 is controlled by the digital processor 405.

The reception system module 403 includes a low noise amplifier (LNA) 406 that amplifies a signal received through the antenna 401, a bandpass filter 407 that extracts the signal in the entire band of this system from the signal amplified by the LNA 406, and multiple reception systems Rx1 to Rx4. Here, four reception systems corresponding to the channels 1 to 4 are shown. In a case of supporting eight channels, eight reception systems may be provided.

The reception system Rx1 corresponding to the channel 1 includes an oscillator (frequency synthesizer) f1, mixers 411 and 412, reception filters 413 and 414, VGAs (Variable Gain Amplifier) 415 and 416 and ADCs (Analog-Digital Converter) 417 and 418. The oscillator f1 generates two signals that have the center frequency f1 of the channel 1 and are orthogonal to each other, and outputs the signals to the mixers 411 and 412. The mixers 411 and 412 perform downconversion by multiplying the signals from the oscillator f1 to the signal having passed through the bandpass filter 407. From the mixers 411 and 412, an I ((In-phase)) signal having the same phase as the signal having passed through the bandpass filter 407, and a Q (Quad-phase))

signal having a phase delayed by 90° therefrom are generated. The I-signal is also called an I-channel signal. The Q-signal is also called a Q-channel signal. The reception filters 413 and 414 extract the signals of band components of the channel 1 from the I-signal and Q-signal. For example, provided that one channel has a bandwidth of 20 MHz, the bandwidths of the reception filters 413 and 414 are 10 MHz. VGAs 415 and 416 adjust the amplifications of the signals having passed through the reception filters 413 and 414 so as to conform to the input widths of the ADCs 417 and 418, and input the signals into the ADCs 417 and 418. The ADCs 417 and 418 AD-convert the input signals and input these signals into the digital processor 405. The digital processor 405 applies the physical layer process, such as demodulation, and various processes on stages thereafter, to the input signal.

The reception systems Rx2 to Rx4 corresponding to the respective channels 2 to 4 have configurations similar to the configuration of the reception system for the channel 1. In the diagram, illustration of the reception system corresponding to the channel 2 is omitted. The reception system Rx3 corresponding to the channel 3 includes an oscillator f3, mixers 431 and 432, reception filters 433 and 434, VGAs (Variable Gain Amplifier) 435 and 436 and ADCs 437 and 438. The reception system Rx4 corresponding to the channel 4 includes an oscillator f4, mixers 441 and 442, reception filters 443 and 444, VGAs (Variable Gain Amplifier) 445 and 446 and ADCs 447 and 448.

The mode where each reception system performs the process for one channel has been described. It may be configured such that adjustment of the frequency of the oscillator and the bandwidth of the reception filter allows one reception system to process a bandwidth in which sequential channels are combined (e.g., the band in which the channels 1 and 2 are combined).

The transmission system module 404 includes multiple transmission systems Tx1 to Tx4, and a preamplifier 408 that amplifies signals output from the transmission systems. Here, four transmission systems corresponding to the channels 1 to 4 are shown. In a case of supporting eight channels, eight transmission systems may be provided.

The transmission system Tx1 corresponding to the channel 1 includes DACs (Digital-Analog Converters) 457 and 458, VGAs (Variable Gain Amplifiers) 455 and 456, transmission filters 453 and 454, mixers 451 and 452, and an oscillator f1. The DACs 457 and 458 receive digital signals that have been subjected to the physical layer process, such as demodulation, and are for the I-channel and Q-channel, and DA-convert the signals. The VGAs 455 and 456 adjust the amplifications of the analog signals in the I-channel and Q-channel to desired levels, and output the signals to the transmission filters 453 and 454. The transmission filters 453 and 454 extract signals in desired bandwidths from the input signals for the I-channel and Q-channel, and output the signals to the mixers 451 and 452. For example, in a case of transmission of the signal for the channel 1 having 20 MHz width, the bandwidths of the transmission filters 453 and 454 are set to be 10 MHz. The oscillator f1 generates two signals that have the center frequency f1 of the channel 1 and are orthogonal to each other, and outputs the signals to the mixers 451 and 452. The mixers 451 and 452 perform upconversion to a radio frequency having a center frequency f1, through multiplying the signals having passed through the transmission filters 453 and 454 by orthogonal signals. The upconverted I-signals and Q-signals are combined, amplified by the preamplifier 408, and subsequently radiated as radio waves from the antenna 401 to the air.

The transmission systems Tx2 to Tx4 corresponding to the respective channels 2 to 4 have configurations similar to the configuration of the transmission system for the channel 1. In the diagram, illustration of the transmission systems corresponding to the respective channels 2 and 3 is omitted. The transmission system Tx4 corresponding to the channel 4 includes DACs 487 and 488, VGAs 485 and 486, transmission filters 483 and 454, mixers 481 and 482, and an oscillator f4.

The mode where each transmission system performs the process for one channel has been described. It may be configured such that adjustment of the frequency of the oscillator and the bandwidth of the transmission filter allows one transmission system to process a bandwidth in which sequential channels are combined (e.g., the band in which the channels 1 and 2 are combined).

Figure 20:
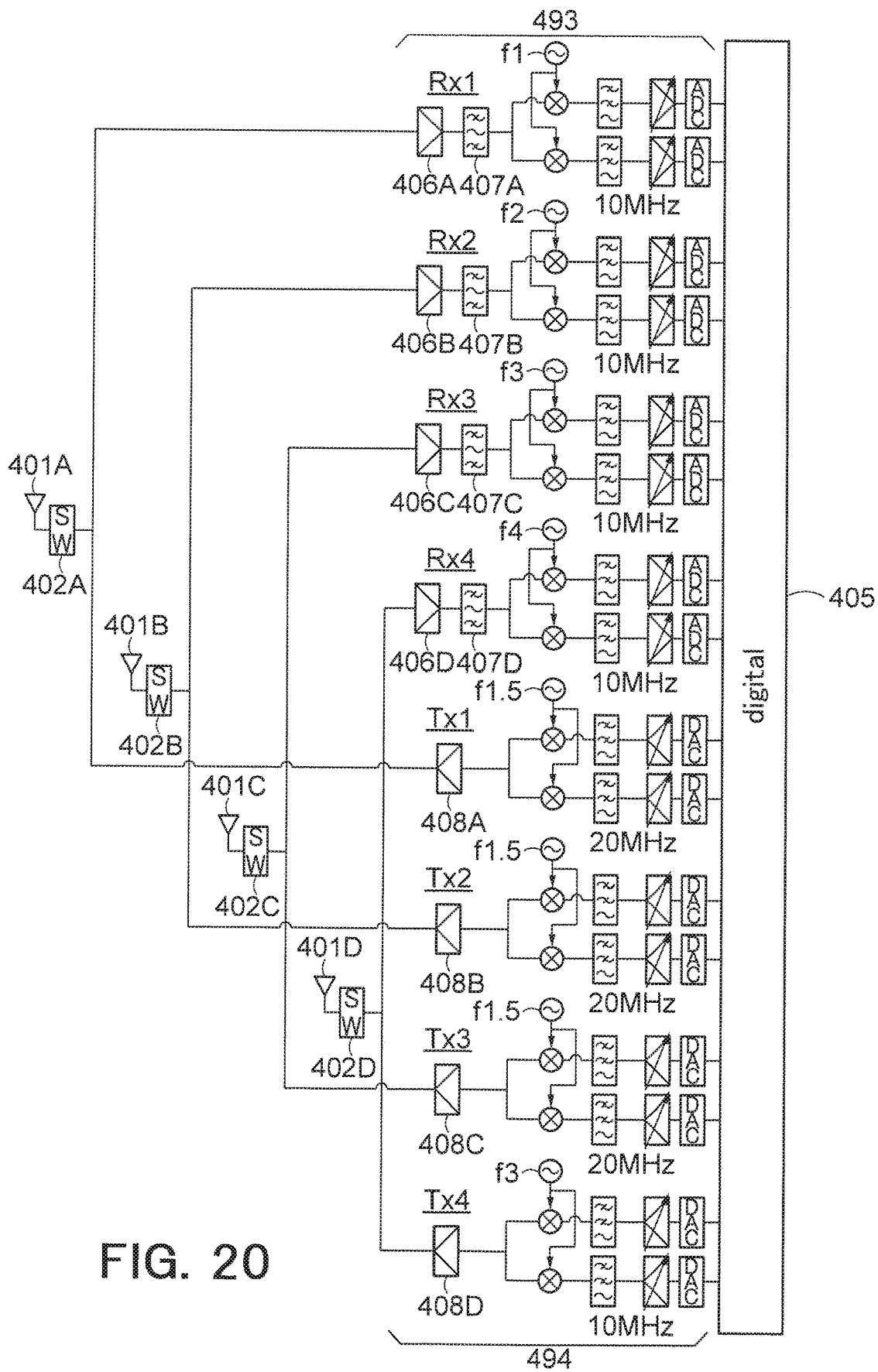
FIG. 20 is a diagram showing another hardware configuration example of the wireless communication device.

FIG. 20 shows another example of a hardware configuration of a wireless communication device according to this embodiment. This configuration corresponds to the hardware configuration example of the wireless communication device mounted on the base station that executes MU-MIMO specifically described in the fourth embodiment. Description is made mainly on the difference from the hardware configuration shown in FIG. 19.

This wireless communication device includes four antennas 401A, 4016, 401C and 401D, four switches 402A, 4026, 402C and 402D, a reception system module 493, a transmission system module 494, and a digital processor 495. The reception system module 493 includes four reception systems Rx1 to Rx4. The transmission system module 494 includes four transmission systems Tx1 to Tx4.

The antenna 401A is connected via the switch 402A to the reception system Rx1 and the transmission system Tx1. Likewise, the antenna 401B is connected via the switch 402B to the reception system Rx2 and the transmission system Tx2. The antenna 401C is connected via the switch 402C to the reception system Rx3 and the transmission system Tx3. The antenna 401D is connected via the switch 402D to the reception system Rx4 and the transmission system Tx4.

In the configuration of FIG. 19, the reception system module 403 includes the bandpass filter 407 and LNA 406, which are common to the multiple reception systems. Meanwhile, in the configuration of FIG. 20, a bandpass filter and an LNA are provided for each reception system. That is, the reception system Rx1 includes an LNA 406A and a bandpass filter 407A. The reception system Rx2 includes an LNA 406B and a bandpass filter 4076. The reception system Rx3 includes an LNA 406C and a bandpass filter 407C. The reception system Rx4 includes an LNA 406D and a bandpass filter 407D.

In the configuration of FIG. 19, the transmission system module includes the bandpass filter, which is common to the multiple transmission systems. Meanwhile, in the configuration of FIG. 20, a bandpass filter is provided for each transmission system. That is, the transmission system Tx1 includes a bandpass filter 408A. The transmission system Tx2 includes a bandpass filter 408B. The transmission system Tx3 includes a band pass filter 408C. The transmission system Tx4 includes a bandpass filter 408D.

The frequencies of the oscillators for the reception systems Rx1 to Rx4 are f1 to f4, which correspond to the respective channels 1 to 4. The bandwidth of each reception filter is configured to be 10 MHz. The channels 1 to 4 have the respective center frequencies f1 to f4. The setting example of these oscillators and reception filters are setting examples for reception of CTS frames and BA frames shown in the sequence example of FIG. 15 in the fourth embodiment. One channel width is assumed as 20 MHz.

The frequencies of the oscillators for the transmission systems Tx1 to Tx4 are f1.5, f1.5, f1.5 and f3, respectively. The bandwidths of the transmission filters are configured to be 20, 20, 20 and 10 MHz, respectively. The setting example of these oscillators and transmission filters are setting examples for transmission of aggregation frames shown in the sequence example of FIG. 15. "f1.5" indicates an intermediate frequency between f1 and f2. Setting of the intermediate frequency is setting that is not for transmission separately in the channels 1 and 2 but is for transmission in a band in which the channels 1 and 2 are combined. In the sequence example of FIG. 15, transmission is simultaneously made to the three terminals in MU-MIMO. Accordingly, also in the setting in FIG. 20, three transmission systems and three antennas are set for MU-MIMO transmission in conformity thereto. The f3 indicates the center frequency of the channel 3.

The detailed operation of each of the reception systems Rx1 to Rx4 and the transmission systems Tx1 to Tx4 are analogous to that in FIG. 19. Consequently, the description thereof is omitted.

Seventh Embodiment

Figure 21:
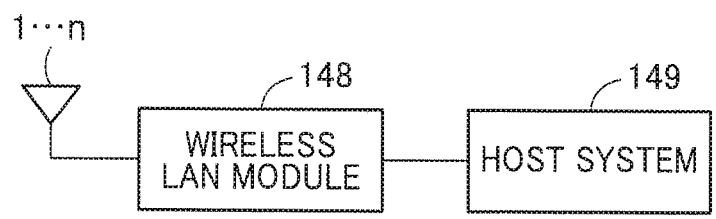
FIG. 21 is a diagram showing an exemplary overall configuration of a terminal or a base station.

FIG. 21 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 22:
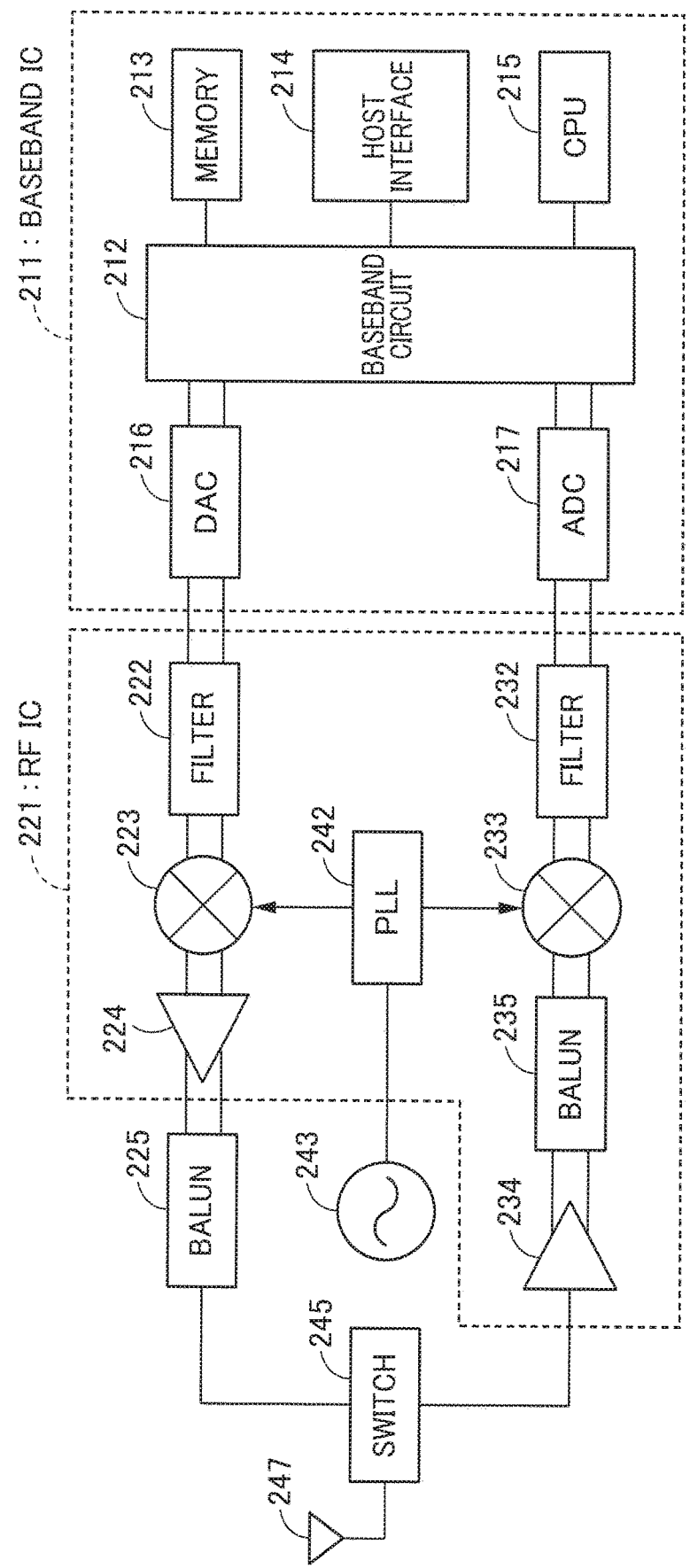
FIG. 22 is a diagram showing an exemplary hardware configuration of a wireless communication device equipped at a base station or a terminal according to an embodiment.

FIG. 22 shows an example of hardware configuration of a wireless LAN module. The configuration can also be applied when the wireless communication apparatus is mounted on either one of the terminal that is a non-base station and the base station. Therefore, the configuration can be applied as an example of specific configuration of the wireless communication device shown in FIG. 7 or 8. As an example of hardware configuration of a wireless LAN module, the configuration of FIG. 19 or FIG. 20 can be also employed. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication apparatus) includes a baseband IC (Integrated Circuit) 211, an RF (Radio Frequency) IC 221, a balun 225, the switch 245, and the antenna 247. The wireless communication integrated circuit according to the present embodiment corresponds, for example, to the baseband IC or a set of the baseband ID and RF IC. The wireless communication integrated circuit further include the balun 225, switch 245, antenna 24 or a combination thereof.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal"). The baseband circuit 212 carries out processing regarding MIMO. For example, it carries out at least one of channel estimation process, transmission weight calculation process or stream separation process or the kike or a plurality of them.

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while keeping the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Eighth Embodiment

Figure 23:
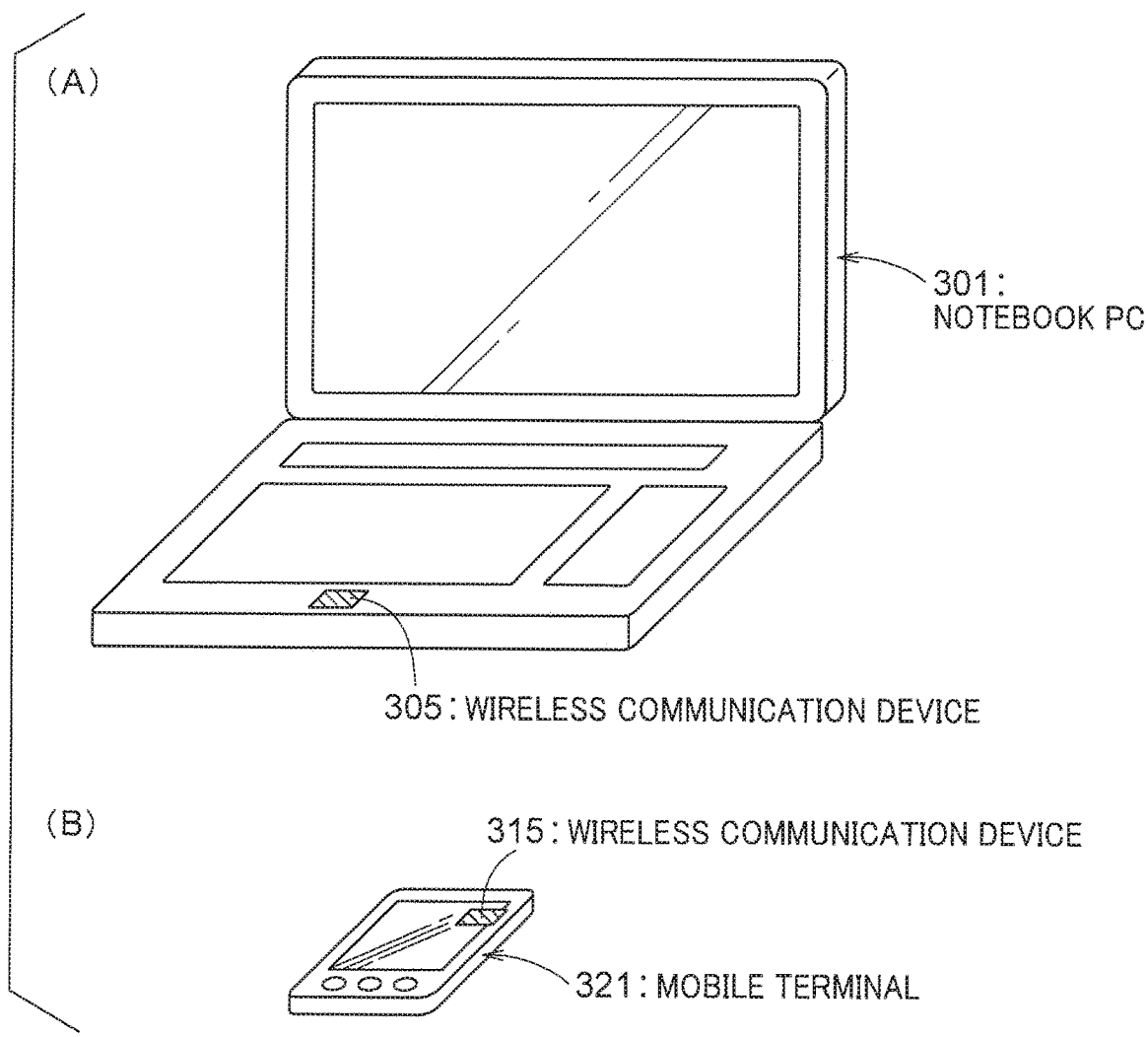
FIG. 23 is a perspective view of a terminal according to an embodiment.

FIG. 23(A) and FIG. 23(B) are perspective views of wireless terminal according to the fifth embodiment. The wireless terminal in FIG. 23(A) is a notebook PC 301 and the wireless communication device (or a wireless device) in FIG. 23(B) is a mobile terminal 321. The notebook PC 301 and the mobile terminal 321 are equipped with wireless communication devices 305 and 315, respectively. The wireless communication device (FIG. 7 and FIG. 8) provided in a terminal or a base station which has been described above or both of them can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 24:
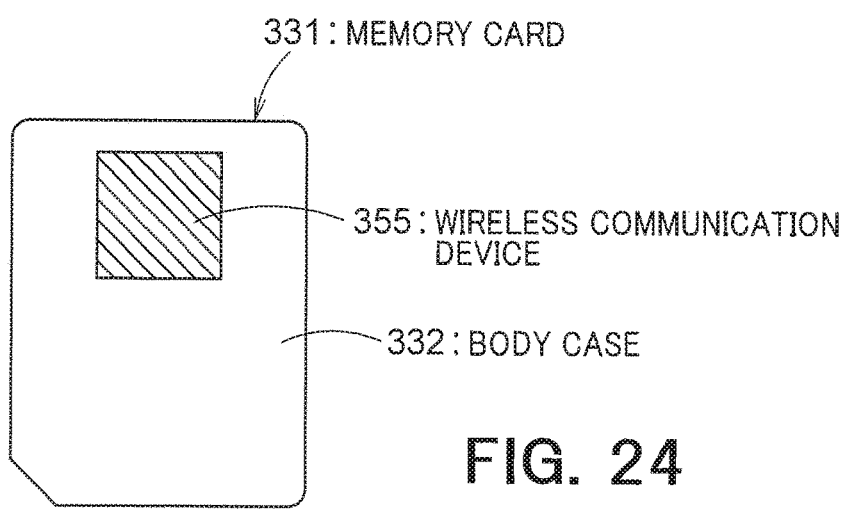
FIG. 24 is a diagram showing a memory card according to an embodiment.

Moreover, at least one of a wireless communication device installed in a terminal or a base station can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

Ninth Embodiment

In the ninth embodiment, a bus, a processor unit and an external interface unit are provided in addition to the configuration of the wireless communication device (the wireless communication device in the base station, the wireless communication device in the wireless terminal or both of them) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the control processing device or the controller according to the present embodiment, or may be another processor that performs a process relating to extending or altering the functions of the processing of the element(s). The processing unit in which the firmware operates may be included in the bases station or the wireless terminal or both of them according to the present embodiment. Alternatively, the processing unit may be included in the integrated circuit of the wireless communication device installed in the base station, or in the integrated circuit of the wireless communication device installed in the wireless terminal.

Tenth Embodiment

In the tenth embodiment, a clock generating unit is provided in addition to the configuration of the wireless communication device (the wireless communication device in the base station, the wireless communication device in the wireless terminal or both of them) according to any of any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eleventh Embodiment

In the eleventh embodiment, a power source unit, a power source controlling unit and a wireless power feeding unit are included in addition to the configuration of the wireless communication device (the wireless communication device in the base station, the wireless communication device in the wireless terminal or both of them) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Twelfth Embodiment

In the twelfth embodiment, a SIM card is added to the configuration of the wireless communication device (the wireless communication device in the base station, the wireless communication device in the wireless terminal or both of them) according to any of the above embodiments. For example, the SIM card is connected with the MAC processor, the transmission processor, the reception processor or some of them in the wireless communication device.

Thus, by adopting a configuration in which the SIM card is included in the wireless communication device, authentication processing can be easily performed.

Thirteenth Embodiment

In the thirteenth embodiment, a video image compressing/decompressing unit is added to the configuration of the wireless communication device (the wireless communication device in the base station, the wireless communication device in the wireless terminal or both of them) according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Fourteenth Embodiment

In the eleventh embodiment, an LED unit is added to the configuration of the wireless communication device (the wireless communication device in the base station, the wireless communication device in the wireless terminal or both of them) according to any of the above embodiments. For example, the LED unit is connected to at least one of the MAC processor, the transmitter, the receiver or some of them. Thus, by adopting a configuration in which the LED unit is included in the wireless communication device, notifying the operation state of the wireless communication device to the user can be easily done.

Fifteenth Embodiment

In the fifteenth embodiment, a vibrator unit is included in addition to the configuration of the wireless communication device (the wireless communication device in the base station, the wireless communication device in the wireless terminal or both of them) according to any of the first to fifth embodiments. For example, the vibrator unit is connected to at least one of the MAC processor, the transmitter, the receiver or some of them. Thus, by adopting a configuration in which the vibrator unit is included in the wireless communication device, notifying the operation state of the wireless communication device to the user can be easily done.

Sixteenth Embodiment

In the sixteenth embodiment, the configuration of the wireless communication device includes a display in addition to the configuration of the wireless communication device (which may indicate the wireless communication device mounted in the terminal, the wireless communication device mounted in the base station) according to any one of the above embodiments. The display may be connected to the MAC processor in the wireless communication device via a bus (not shown). As seen from the above, the configuration including the display to display the operation state of the wireless communication device on the display allows the operation status of the wireless communication device to be easily notified to a user.

Seventeenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
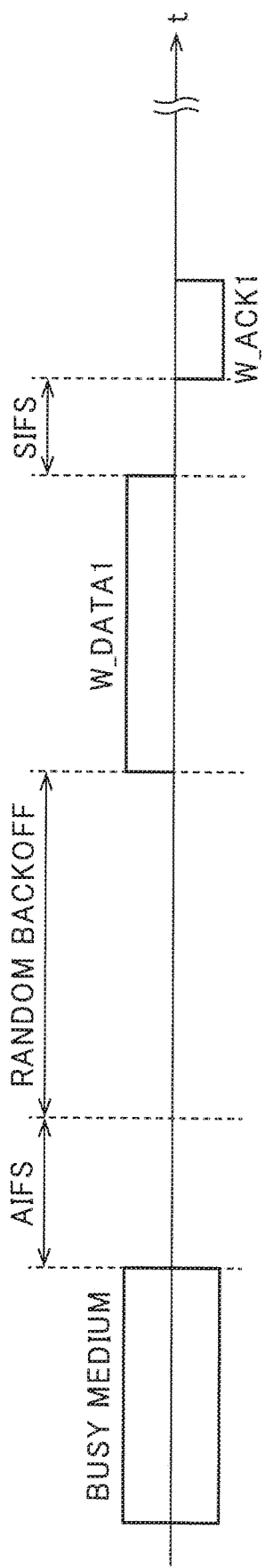
FIG. 25 is a diagram showing an example of frame exchange during a contention period.

Here, FIG. 25 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device, comprising:
a receiver configured to receive a first frame that requests permission for transmission at a first frequency band from a first wireless communication device, the first frame being not addressed for the wireless communication device;
a transmitter electrically coupled with the receiver; and
controlling circuitry configured to:
prevent the transmitter from transmitting at the first frequency band during a first time period upon reception of the first frame,
keep prevention of the transmitter at the first frequency band if a second frame is received in the receiver at the first frequency band in an inter-frame space after the receiver receives the first frame,
keep prevention of the transmitter at the first frequency band even when the second frame is not received in the receiver at the first frequency band in an elapse of the inter-frame space after the receiver receives the first frame,
wherein the second frame is transmitted by a second wireless communication device which is a destination terminal of the first frame and is addressed for the first wireless communication device, and the second frame notifies that the first wireless communication device is permitted to transmit a third frame at the first frequency band,
wherein the first frame is a frame compliant with the IEEE 802.11 standard,
wherein a value indicating a second time period is set in a duration field of the first frame.

2. The wireless communication device according to claim 1, wherein the controlling circuitry is configured to cancel prevention of the transmitter when the receiver receives a fourth frame for cancelling prevention of the transmitter before the first time period elapses.

3. The wireless communication device according to claim 1, further comprising at least one antenna.

4. The wireless communication device according to claim 1, wherein a plurality of the first frames are transmitted by a base station via a plurality of frequency band, the first frames are addressed to a plurality of wireless communication devices, and a length of the first time period is dependent on a number of the plurality of wireless communication devices.

5. A wireless communication device comprising:
a receiver configured to receive a first frame that requests permission for transmission from a first wireless communication device;
a transmitter electrically coupled with the receiver; and
controlling circuitry configured to prevent the transmitter from transmitting during a first time period upon reception of the first frame,
wherein the controlling circuitry determines whether the first wireless communication device is a base station,
wherein if the first wireless communication device is not the base station and the receiver does not receive a second frame in an elapse of an inter-frame space after the receiver receives the first frame, the controlling circuitry is configured to cancel prevention of the transmitter,
wherein if the first wireless communication device is the base station and the receiver does not receive the second frame in the elapse of the inter-frame space after the receiver receives the first frame, the controlling circuitry is configured to keep the prevention of the transmitter,
wherein when the receiver receive the second frame in the elapse of the inter-frame space after the receiver receives the first frame, the controlling circuitry is configured to keep the prevention of the transmitter regardless whether the first wireless communication device is the base station, and wherein the second frame is transmitted by a second wireless communication device which is a destination terminal of the first frame and the second frame notifies device that the first wireless communication device is permitted to transmit a third frame.

6. A wireless communication device operable to communicate with a first wireless communication device capable of performing a resource-unit-based OFDMA (Orthogonal Frequency Division Multiple Access) communication based on a plurality of resource units, the wireless communication device comprising:
 a receiver configured to receive a first frame that requests permission for transmission via a first resource unit of the plurality of resource units from the first wireless communication device;
 a transmitter electrically coupled with the receiver; and
 controlling circuitry configured to prevent the transmitter from transmitting at the first resource unit during a first time period if the first frame is not addressed for the wireless communication device, and
 wherein the controlling circuitry is configured to
  keep prevention of the transmitter at a first frequency band if a second frame is received in the receiver at the first frequency band in an inter-frame space after the receiver receives the first frame,
  keep prevention of the transmitter at the first frequency band even when the second frame is not received in the receiver at the first frequency band in an elapse of the inter-frame space after the receiver receives the first frame, and
  wherein the second frame transmitted by a second wireless communication device which is a destination terminal of the first frame is addressed for the first wireless communication device, and the second frame notifies that the first wireless communication device is permitted to transmit a third frame at the first frequency band,
 wherein the controlling circuitry is configured to keep prevention of the transmitter at the first resource unit even when the second frame is not received via the first resource unit in the elapse of the inter-frame space after the receiver receives the first frame.

7. A wireless communication device operable to communicate with a first wireless communication device capable of performing a resource-unit-based OFDMA (Orthogonal Frequency Division Multiple Access) communication based on a plurality of resource units, the wireless communication device comprising:
 a receiver configured to receive a first frame that requests permission for transmission via a second resource unit of the plurality of resource units from the first wireless communication device;
 a transmitter electrically coupled with the receiver; and
 controlling circuitry configured to prevent the transmitter from transmitting at the second resource unit during a first time period if the first frame is not addressed for the wireless communication device,
 wherein the receiver is configured to receive a second frame including an execution period of the resource-unit-based OFDMA communication, via a first resource unit of the plurality of resource units,
 wherein if the first frame is received during a time period other than the execution period of the resource-unit-based OFDMA communication and a third frame is not received in a lapse of an inter-frame space after the receiver receives the first frame, the controlling circuitry is configured to cancel prevention of the transmitter at the second resource unit, wherein the third frame is transmitted by a second wireless communication device that is a destination terminal of the first frame and is addressed for the first wireless communication device, and wherein the third frame notifies that the first wireless communication device is permitted to transmit a fourth frame at the first frequency band,
 wherein if the first frame is received during the execution period of the resource-unit-based OFDMA communication, the controlling circuitry is configured to keep prevention of the transmitter at the second resource unit even if the third frame is not received in the lapse of the inter-frame space after the receiver receives the first frame.

8. A wireless communication device operable to communicate with a plurality of terminals using a resource-unit-based OFDMA (Orthogonal Frequency Division Multiple Access) based on a plurality of resource units, each of the plurality of resource units comprising a plurality of subcarriers and being part of at least one frequency channel, the wireless communication device comprising:
 a transmitter configured to simultaneously transmit a first frame requesting permission for transmission via a first resource unit and a second frame requesting permission for transmission via a second resource unit in the resource-unit-based OFDMA;
 a receiver configured to simultaneously receive a third frame from a first destination terminal of the first frame via the first resource and a fourth frame from a second destination terminal of the second frame via the second resource in the resource-unit-based OFDMA, wherein the third frame is transmitted in response to the first frame and notifies that the wireless communication device is permitted to perform transmission via the first resource unit and the fourth frame is transmitted in response to the second frame and notifies that the wireless communication device is permitted to perform transmission via the second resource unit; and
 a switch configured to connect an antenna to one of the transmitter and the receiver;
 wherein when the third frame is received in a lapse of a first inter-frame space after the transmitter transmits the first frame and when the fourth frame is not received in the lapse of the first inter-frame space after the transmitter transmits the second frame, the transmitter simultaneously transmits a fifth frame addressed to the first destination terminal via the first resource unit, and a sixth frame addressed to a third terminal different from the second destination terminal via the second resource unit in the resource-unit-based OFDMA in a lapse of a second inter-frame space after the receiver receives the third frame.

9. The wireless communication device according to claim 8, further comprising at least one antenna.

10. A wireless communication device operable to communicate with a plurality of terminals using a resource-unit-based OFDMA (Orthogonal Frequency Division Multiple Access) based on a plurality of resource units, each of the plurality of resource units comprising a plurality of subcarriers and being part of at least one frequency channel, the wireless communication device comprising:
 a transmitter configured to simultaneously transmit a first frame requesting permission for transmission via a first resource unit, and a second frame requesting permission for transmission via a second resource unit in the resource-unit-based OFDMA, wherein each of the first and the second frames includes information of a first time period during which a first terminal and a second terminal are prevented to perform transmission, the first terminal is a terminal other than a destination terminal of the first frame among terminals having received the first frame and the second terminal is a terminal other than a destination terminal of the second frame among terminals having received the second frame;

a receiver configured to simultaneously receive a third frame from the destination terminal of the first frame via the first resource and a fourth frame from the destination terminal of the second frame via the second resource in the resource-unit-based OFDMA, wherein the third frame is transmitted in response to the first frame and notifies that the wireless communication device is permitted to perform transmission and the fourth frame is transmitted in response to the second frame and notifies that the wireless communication device is permitted to perform transmission;

a switch configured to connect an antenna to one of the transmitter and the receiver;

control circuitry configured to control the transmitter, the receiver and the switch, wherein when the third frame is received in a lapse of an inter-frame space after the transmitter transmits the first frame and when the fourth frame is not received after the lapse of the inter-frame space after the transmitter transmits the second frame, the control circuitry communicates with the destination terminal of the first frame via the first resource unit after the receiver receives the third frame before the first time period ends and does not communicate with the destination terminal of the second frame via the second resource, wherein after the control circuitry communicates with the destination terminal of the first frame ends and before the first time period ends, the transmitter is configured to transmit a fifth frame via the first resource unit and a sixth frame via the second resource unit, wherein the fifth frame forcibly cancels prevention of transmission for the first terminal before the first time period ends and the sixth frame forcibly cancels prevention of transmission for the second terminal before the first time period ends.

11. The wireless communication device according to claim 10, further comprising at least one antenna.

12. The wireless communication device according to claim 10, the transmitter transmits simultaneously transmit a plurality of frames including the first frame and the second frame to a plurality of terminals, and a length of the first time period is dependent on a number of the terminals.

13. A wireless communication device operable to communicate with a plurality of terminals using a resource-unit-based OFDMA (Orthogonal Frequency Division Multiple Access) based on a plurality of resource units, each of the plurality of resource units comprising a plurality of subcarriers and being part of at least one frequency channel, the wireless communication device comprising:

a transmitter configured to simultaneously transmit a first frame requesting permission for transmission via a first resource unit and a second frame permission for transmission via a second resource unit in the resource-unit-based OFDMA, the first and second frames each including information of a first time period during which a first terminal and a second terminal are prevented to transmit a frame other than a response frame, the first terminal being a terminal other than a destination terminal of the first frame among terminals having received the first frame and the second terminal is a terminal other than a destination terminal of the second frame among terminals having received the second frame; and a receiver configured to receive a third frame from the destination terminal of the first frame via the first resource and a fourth frame from the destination terminal of the second frame via the second resource unit in the resource-unit-based OFDMA, wherein the third frame is transmitted in response to the first frame and notifies that the wireless communication device is permitted to perform transmission and the fourth frame is transmitted in response to the second frame and notifies that the wireless communication device is permitted to perform transmission, wherein when the third frame is received in a lapse of a first inter-frame space after the transmitter transmits the first frame, the transmitter is configured to transmit a plurality of fifth frames in a spatial multiplexing manner to the destination terminal of the first frame and at least one third terminal via the first resource unit in a lapse of a second inter-frame space after the receiver receives the third frame, the at least one third terminal being different from either the destination terminal of the first frame or the destination terminal of the second frame, wherein when the fourth frame is received in the lapse of the first inter-frame space after the transmitter transmits the second frame, the transmitter is configured to transmit a sixth frame to the destination terminal of the second frame via the second resource unit in the lapse of the second inter-frame space after the receiver receives the fourth frame, wherein the receiver is configured to sequentially receive a plurality of seventh frames indicating acknowledgements for the plurality of fifth frames via the first resource unit after the transmitter transmits the fifth frames, and wherein the receiver is configured to receive an eighth frame indicating an acknowledgement for the sixth frame via the second resource unit after the transmitter transmits the sixth frame, and wherein the first time period is longer than or equal to a time period required to receive all the plurality of seventh frames after the transmitter transmits the first frame.

14. The wireless communication device according to claim 13, further comprising at least one antenna.

15. The wireless communication device according to claim 13, a length of the first time period is dependent on a total number of the destination terminal of the first frame and at least one third terminal.

* * * * *